United States Patent
Hong et al.

(10) Patent No.: US 11,983,033 B2
(45) Date of Patent: May 14, 2024

(54) COMPUTING SYSTEM

(71) Applicant: LENOVO (SINGAPORE) PTE. LTD., Singapore (SG)

(72) Inventors: Jung Hwan Hong, Morrisville, NC (US); Ali Ent, Morrisville, NC (US); Ghwang Hyun Lim, Morrisville, NC (US); Alden Rose, Morrisville, NC (US); Jeffrey E Skinner, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/954,882

(22) Filed: Sep. 28, 2022

(65) Prior Publication Data
US 2024/0103565 A1  Mar. 28, 2024

(51) Int. Cl.
*G06F 1/16* (2006.01)
(52) U.S. Cl.
CPC .................................. *G06F 1/1601* (2013.01)
(58) Field of Classification Search
CPC .............................. G06F 1/1601; G06F 1/1632
See application file for complete search history.

(56) References Cited

U.S. PATENT DOCUMENTS

| | | | | |
|---|---|---|---|---|
| 9,935,669 | B1* | 4/2018 | Kuo | G06F 1/1626 |
| 10,836,325 | B1* | 11/2020 | Seko | B60R 11/0241 |
| 10,969,825 | B2* | 4/2021 | Lo | G06F 1/1632 |
| 11,144,096 | B2* | 10/2021 | Cho | G06F 1/1626 |
| 11,812,571 | B2* | 11/2023 | Venkatesh | H05K 5/0217 |
| 2014/0355200 | A1* | 12/2014 | Thiers | H04M 1/04 361/679.41 |
| 2018/0122201 | A1* | 5/2018 | Chiang | G08B 13/22 |
| 2019/0220059 | A1* | 7/2019 | Miles | H01R 13/6205 |
| 2019/0377387 | A1* | 12/2019 | Kao | G06F 1/1616 |
| 2020/0285279 | A1* | 9/2020 | Zimmerman | G06F 3/0383 |
| 2021/0072792 | A1* | 3/2021 | DeCamp | G06F 1/1632 |
| 2021/0209048 | A1* | 7/2021 | Lo | G06F 1/1654 |
| 2021/0265089 | A1* | 8/2021 | Eliason | H01F 7/0252 |

* cited by examiner

*Primary Examiner* — Rockshana D Chowdhury
(74) *Attorney, Agent, or Firm* — Brian J. Pangrle

(57) ABSTRACT

A system can include a display device that includes a rectangular housing that includes a back side that includes a first arrangement of magnets; and a stand that includes a base, a flap and a hinge that couples the flap to the base, where the flap includes a second arrangement of magnets, where the first arrangement of magnets and the second arrangement of magnets provide a first magnetic attraction force that couples the rectangular housing to the flap in a first position and a second magnetic attraction force that couples the rectangular housing to the flap in a second position, where, in the second position, the rectangular housing is rotated by 90 degrees with respect to the first position.

19 Claims, 23 Drawing Sheets

COMPUTING SYSTEM

TECHNICAL FIELD

Subject matter disclosed herein generally relates to computing systems.

BACKGROUND

A computing system can include a display assembly, a processor and memory.

SUMMARY

A system can include a display device that includes a rectangular housing that includes a back side that includes a first arrangement of magnets; and a stand that includes a base, a flap and a hinge that couples the flap to the base, where the flap includes a second arrangement of magnets, where the first arrangement of magnets and the second arrangement of magnets provide a first magnetic attraction force that couples the rectangular housing to the flap in a first position and a second magnetic attraction force that couples the rectangular housing to the flap in a second position, where, in the second position, the rectangular housing is rotated by 90 degrees with respect to the first position. Various other apparatuses, assemblies, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the invention should be ascertained with reference to the issued claims.

Figure 1:
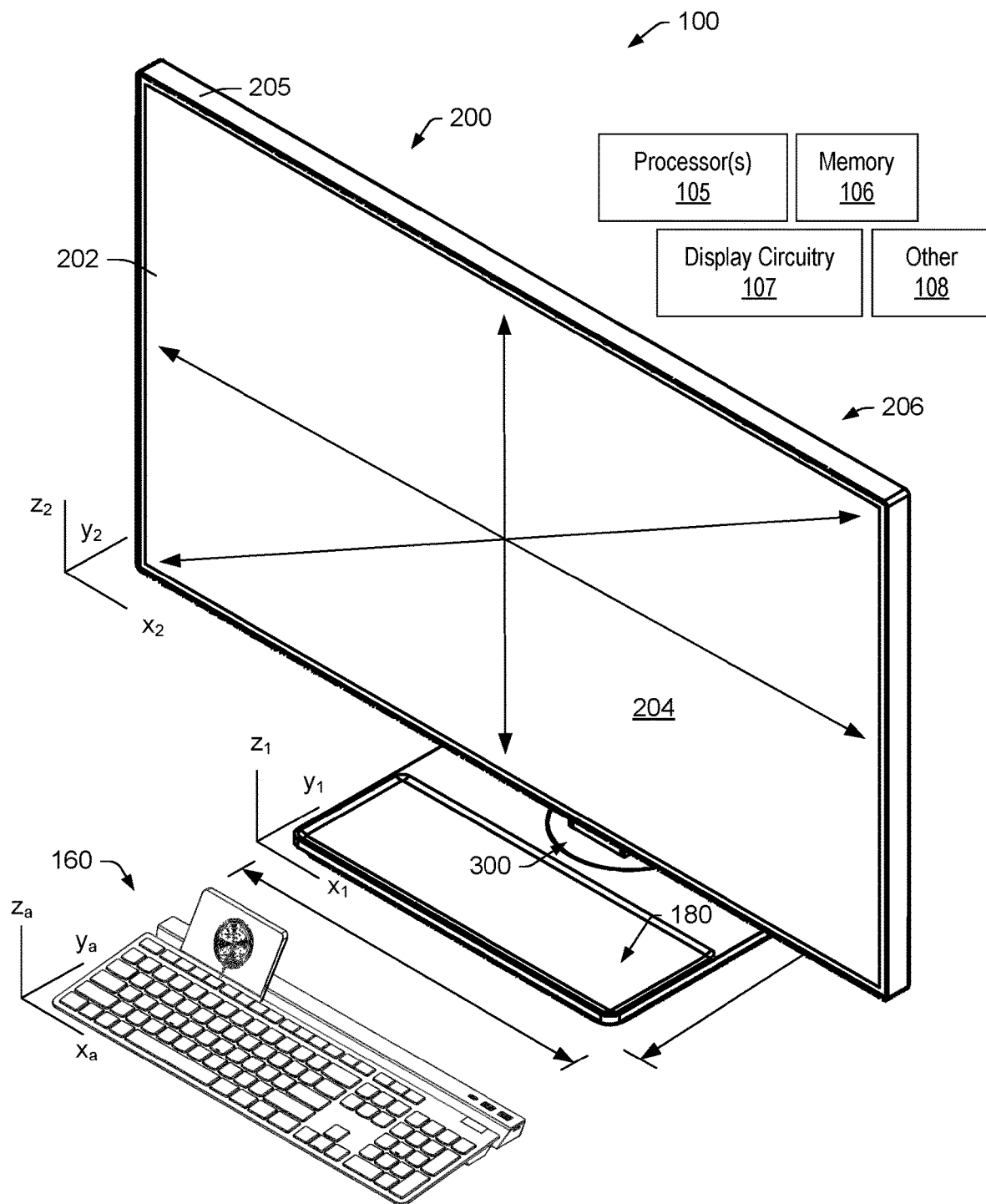
FIG. 1 is a perspective view of an example of a system.

FIG. 1 shows a perspective view of an example of a system 100 that can include one or more processors 105, memory 106 accessible to at least one of the one or more processors 105, display circuitry 107 and one or more other components 108, which can include electronic circuitry, instructions stored in the memory 106 and executable by at least one of the one or more processors 105, etc. As an example, the system 100 may include one or more accessories, peripherals, etc.

In the example of FIG. 1, the system 100 includes an example of a keyboard assembly 160 that may be operatively coupled to at least one of the one or more processors 105 (e.g., via wire, via wireless communication circuitry, etc.). The system 100 may include a platform 180 that can accommodate the keyboard assembly 160. For example, the keyboard assembly 160 may be positioned on the platform 180.

As shown in FIG. 1, the system 100 includes a display assembly 200 with a display 202 that may utilize one or more technologies (e.g., LED, LCD, etc.). The display assembly 200 can include a display side 204, a back side 206 and a frame 205. The display circuitry 107 can be operatively coupled to at least one of the one or more processors 105, for example, to receive data, instructions, etc., for rendering text, graphics, images, etc., to the display side 204 of the display 202. As an example, the display assembly 200 may be a computing device. For example, consider an all-in-one (AIO) type of computing device or another type of computing device. As an example, a display assembly such as the display assembly 200 may be referred to as a display device.

As an example, the display circuitry 107 can include one or more graphics processing units (GPUs) and, for example, one or more of the one or more processors 105 can be a central processing unit (CPU). As an example, the display circuitry 107 can include input circuitry such as touch circuitry, digitizer circuitry, etc., such that the display side 204 is an input surface. For example, the display side 204 may receive input via touch, a stylus, etc. As an example, the display assembly 200 can include a touchscreen display where a finger, a stylus, etc., can be utilized; noting sensing as to input may occur with or without physical contact between a finger and the display side 204, between a stylus and the display side 204, etc., depending on the type of input circuitry utilized (e.g., resistive, capacitive, acoustic wave, infrared, optical, dispersive signal, etc.).

In the example of FIG. 1, the system 100 can include a stand 300 that can support the display assembly 200, for example, by coupling to the back side 206 of the display assembly 200. As shown in the example of FIG. 1, the display side 204 may be centered along a centerline of the system 100 and may be disposed at an angle that may be defined by the platform 180 (e.g., if present), the stand 300, a flat support surface such as a desktop, a tabletop, a countertop, etc.

As shown, the platform 180 and/or the stand 300, the display assembly 200 and/or the display side 204 can be defined with respect to one or more coordinate systems such as, for example, one or more Cartesian coordinate systems (see, e.g., $x_1$, $y_1$, $z_1$ and $x_2$, $y_2$, $z_2$). As shown, the display side 204 can be defined by a display area, which may be two-dimensional for a substantially flat (e.g., planar) display surface or which may be three-dimensional for a curved display surface, noting that such a curve may be of a relatively large radius of curvature (e.g., 50 cm or more) that gives the display a gentle curve (e.g., consider a radius of approximately the length of an extended arm of a user as traced by movement left and right from a shoulder of a user positioned in front of the display surface by an ergonomic distance). A gap or clearance can exist between a lower edge of the display assembly 200 and a support surface (e.g., a stand, a platform, a desktop, tabletop, countertop, etc.). Such a gap may provide for rotation of the display 202 (e.g., from a landscape orientation to a portrait orientation).

In the example of FIG. 1, the keyboard assembly 160 is illustrated along with a Cartesian coordinate system with $x_a$, $y_a$ and $z_a$ coordinates that may be utilized to describe one or more features of the keyboard assembly 160. As shown, the coordinate $x_a$ can define a length (side to side), the coordinate $y_a$ can define a depth (front to back) and the coordinate $z_a$ can define a height (bottom to top).

The system 100 may include one or more instances of charging circuitry. For example, when the keyboard assembly 160 is positioned on the platform 180, one or more rechargeable batteries of the keyboard assembly 160 may be charged (e.g., via a contact and/or contactless interface, which may be a wireless interface). A wireless interface may include one or more features of the Qi standard.

Components that operate with the Qi standard utilize electromagnetic induction between coils. For example, a wireless charging system can include a base station that is connected to a power source for providing inductive power and a positionable device or assembly that can consume the provided inductive power. A base station can include a power transmitter that includes a transmitter coil that generates an oscillating magnetic field and the positionable device or assembly can include a power receiver that includes a receiver coil. In such an arrangement, a magnetic field can induce an alternating current in the receiver coil via Faraday's law of induction. To make transfer or power more efficient, a system can provide for close spacing of coils, shielding on their surfaces, etc.

Figure 2:
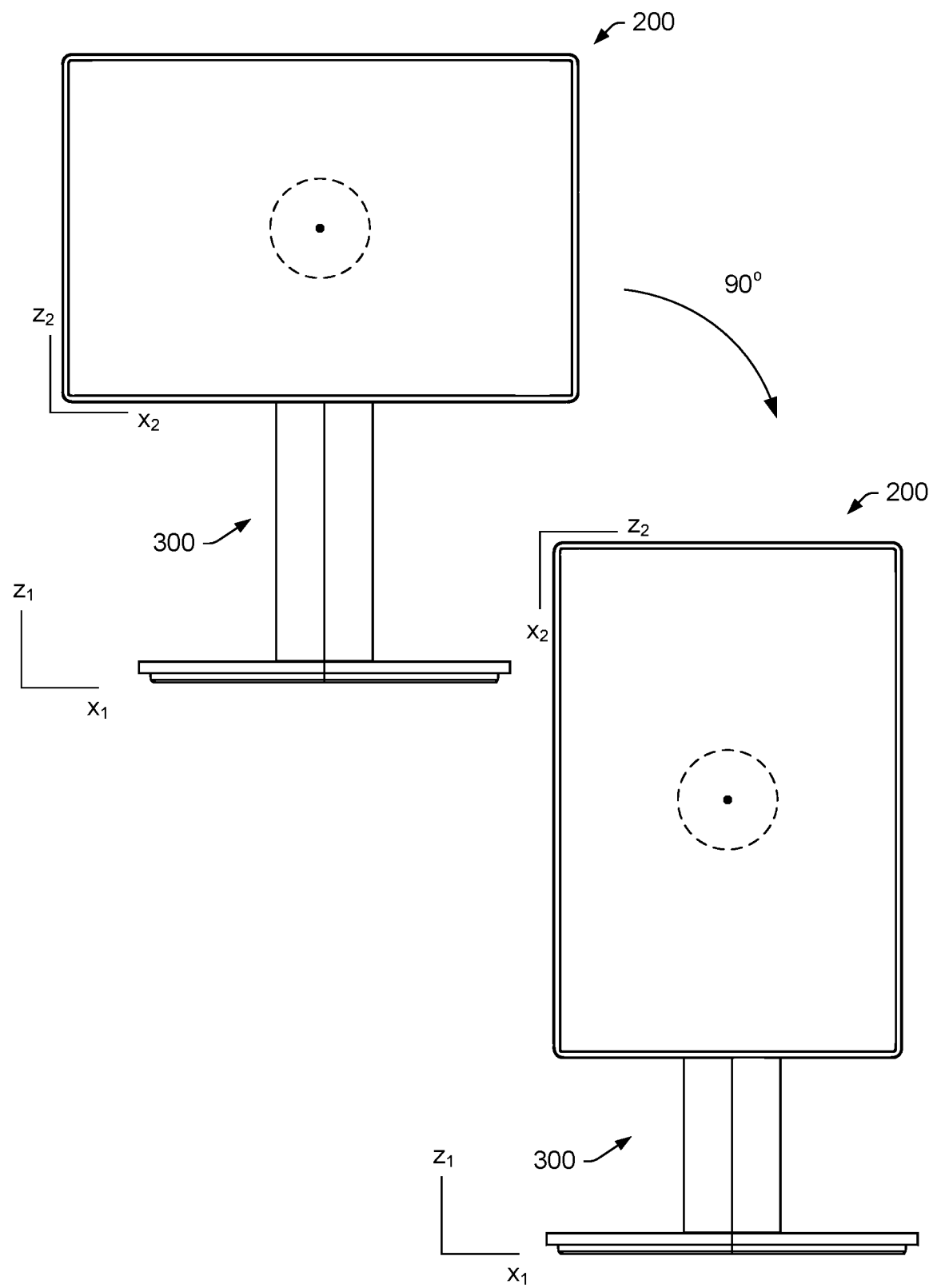
FIG. 2 is a series of front views of an example of a system.

FIG. 2 shows views of the display assembly 200 and the stand 300 where the display assembly 200 can be rotated from a landscape orientation to a portrait orientation and from a portrait orientation to a landscape orientation. As mentioned, a gap or clearance can exist between a lowermost edge of the display 202 and a surface, which may be a stand surface or another surface (e.g., tabletop, desktop, countertop, etc.) such that the display 202 can be transitioned from one orientation to another orientation without raising a center point of the display 202.

Figure 3:
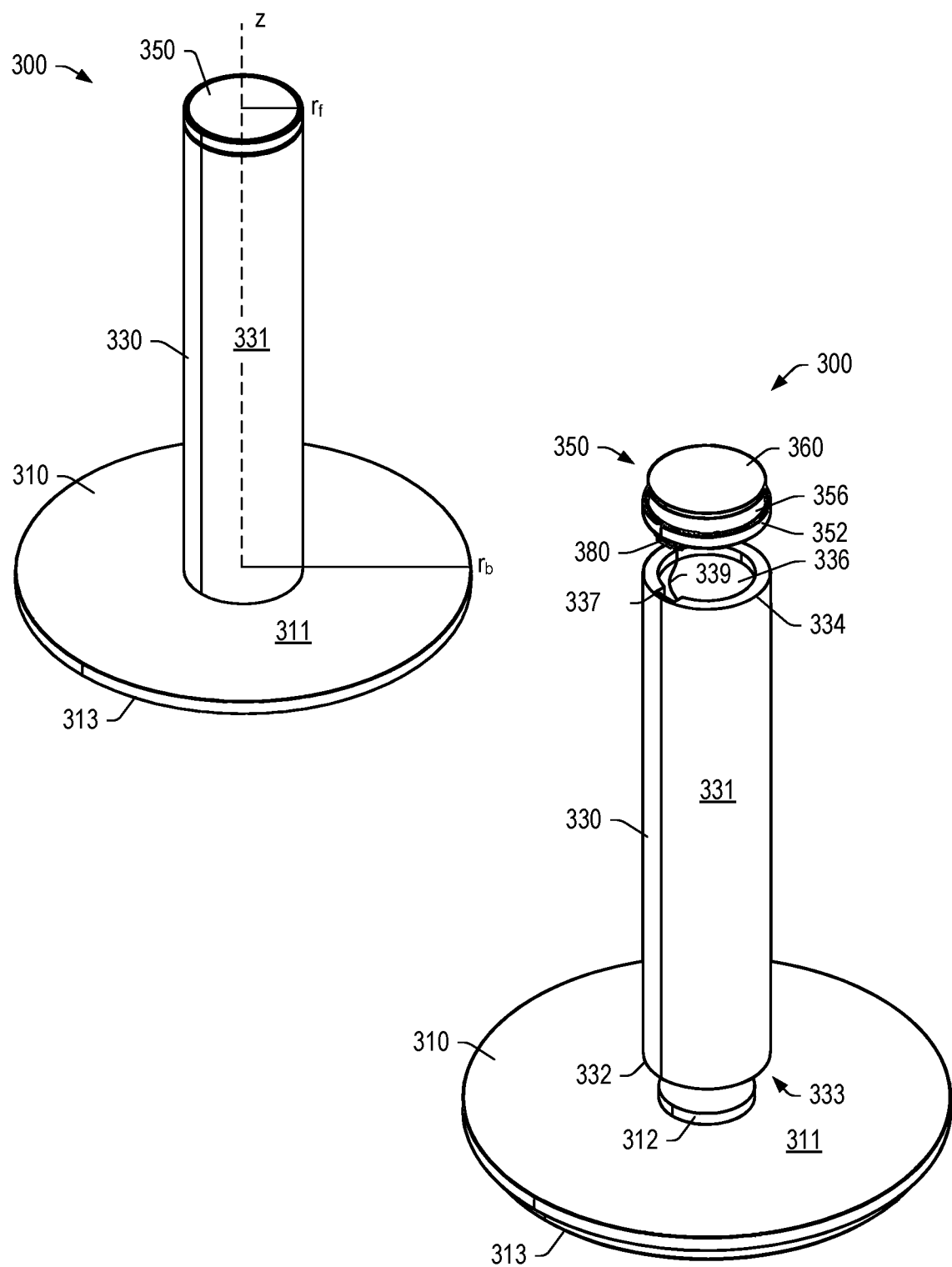
FIG. 3 is a series of perspective views of an example of a stand.

FIG. 3 shows a perspective view and an exploded perspective view of an example of the stand 300. In the example of FIG. 3, a cylindrical coordinate system is shown with a z-axis and an r-axis, which may be utilized to define one or more features of the stand 300.

In FIG. 3, the stand 300 can include a planar support 310 and a cylindrical base 330 that extends upwardly from the planar support 310. As shown, the stand 300 can include the base 330, a flap 350 and a hinge 380 that couples the flap 350 to the base 330. In such an example, the flap 350 can include features for coupling to a display assembly such as, for example, the display assembly 200. In the examples of FIG. 1 and FIG. 2, the flap 350 may be at a 90 degree angle such that the display 202 is at a 90 degree angle, noting that adjustment of an angle of the flap 350 with respect to the base 330 can provide for adjustment of the display side 204 of the display 202.

As shown in FIG. 3, the planar support 310 can be disk shaped with a top surface 311 and an opposing bottom surface 313, which may be substantially parallel. The base 330 can include an outer cylindrical surface 331 that extends between the planar support 310 and the flap 350. For example, the base 330 can include a lower end 332 and an upper end 334 where the outer cylindrical surface 331 extends between the lower end 332 and the upper end 334.

As an example, the base 330 may be decoupled from the planar support 310. For example, the planar support 310 can include an extension 312 that can be received in a socket 333 at the lower end 332 of the base 330. The base 330 can also include a recess 336 at the upper end 334 that can receive a portion of the flap 350, noting that the base 330 can include a hinge slot 337 (e.g., or hinge slots) at the upper end 334 that can receive a portion of the hinge 380 to couple the hinge 380 to the flap 350. As shown, a wire or wires 339 may be included, for example, to provide for electrical connection to the flap 350. For example, the flap 350 may include one or more connectors, contacts, etc., for establishing an electrical connection to a display such as, for example, the display 202.

In the exploded view, the flap 350 is shown as including a cap 360 that can be received in a recess 356 of a hinged disk 352. As shown in the example of FIG. 3, the hinged disk 352 can be coupled to the hinge 380 where the hinge 380 can include an axle or axles that can be received by features of the hinge slot 337. For example, the hinge slot 337 can include bores or bushing that can receive axle ends of the hinge 380 such that the flap 350 is rotatable via the hinge 380 to move, for example, between a horizontal position and a vertical position; noting that the flap 350 may be adjusted to an position that is between the horizontal position and the vertical position. As an example, the hinge 380 can be a friction hinge that can hold a position of the flap 350, even when the flap 350 is coupled to a display assembly, which may be a computing device, a computing system, etc.

Figure 4:
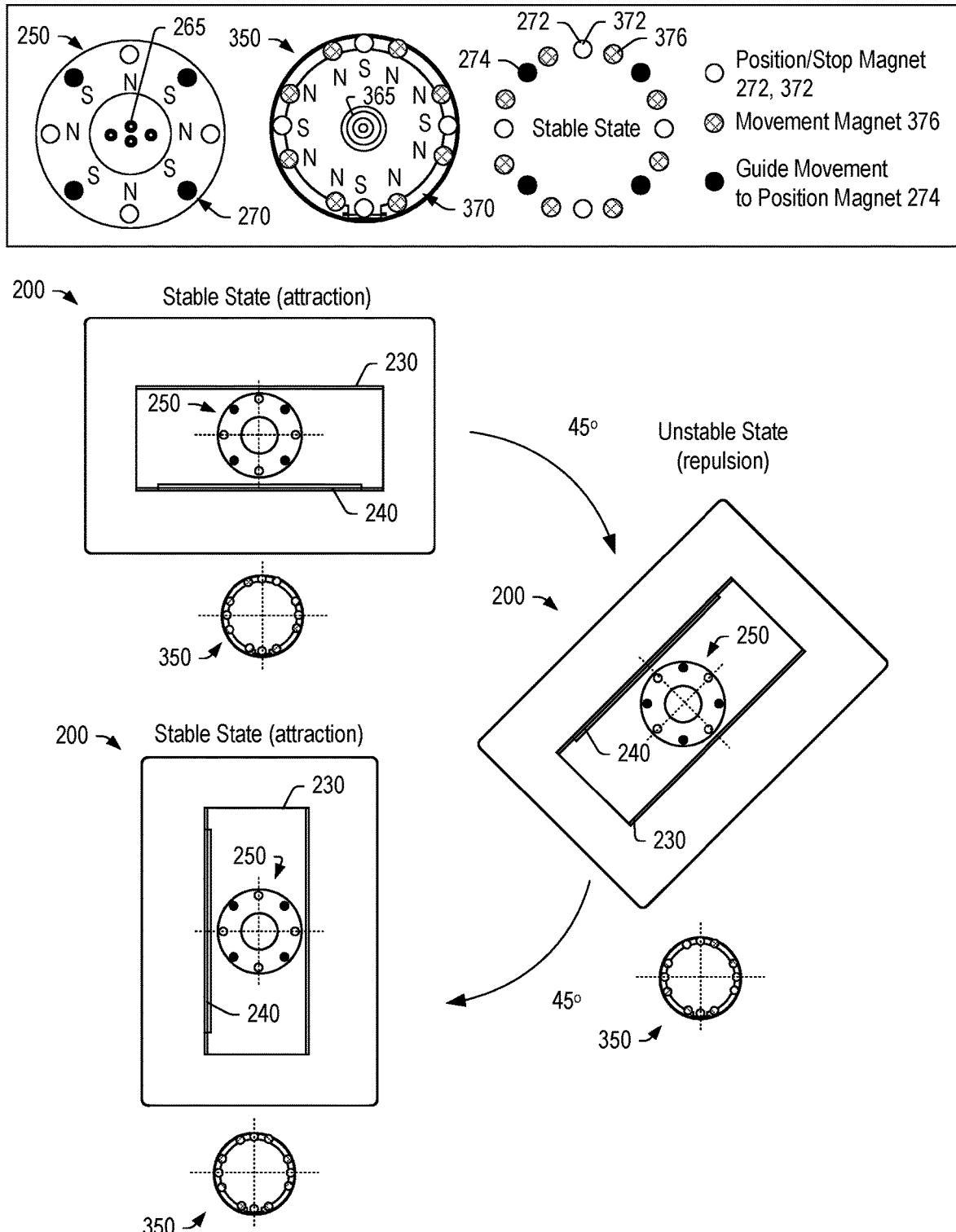
FIG. 4 is a series of views of examples of arrangements of magnets with respect to a display assembly and a stand.

FIG. 4 shows an example of the display assembly 200 and an example of the flap 350 where the display assembly 200 can include a magnetic coupling 250. As an example, the display assembly 200 may include a panel 230 and a hinge 240 that couples the panel 230 to the display 202. As an example, the magnetic coupling 250 may be on a back side of the display 202 and/or on a side of the panel 230.

As mentioned with respect to FIG. 2, the stand 300 can provide for transitioning the display assembly 200 between a landscape orientation and a portrait orientation. In such an example, the flap 350 of the stand 300 can remain fixed while the display assembly 200 rotates. To guide a transition, the flap 350 can include an arrangement of magnets 370 to make the flap 350 a magnetic coupling while the magnetic coupling 250 can include another arrangement of magnets 270. Such arrangements of magnets 270 and 370 can provide for stable states at horizontal and vertical (e.g., landscape and portrait) and for guide states that can help to guide the display assembly 200 to one of the stable states.

In the example of FIG. 4, the arrangement of magnets 270 is shown as including position or stop magnets 272 and guide magnets 274 that guide movement to one of the stable states (e.g., stable positions). To provide for guidance, the guide magnets interact with movement magnets 376 of the arrangement of magnets 370 of the flap 350 to urge the display assembly 200 to one of the stable states. As shown, the arrangement of magnets 370 of the flap 350 also includes position or stop magnets 372 that can interact with the position or stop magnets 272 of the display assembly 200 to generate a magnetic attraction force that is sufficient to maintain the display assembly 200 in the portrait orientation or the landscape orientation. As an example, between portrait and landscape, magnetic repulsion may be utilized in combination with magnetic attraction. For example, magnetic repulsion may be the greatest at 45 degrees where magnetic attraction acts to urge the display assembly 200 to horizontal or to vertical. Akin to a compass needle that has a stable state pointing to magnetic north where a deviation therefrom experiences force that returns the compass needle to north, the arrangements of magnets 270 and 370 can act to guide the display assembly 200 to a portrait orientation or to a landscape orientation.

In the example of FIG. 4, some poles are indicated using labels N and S, which are opposite poles (e.g., north pole and south pole). In such an example, the poles N of the arrangement of magnets 270 and the poles S of the arrangement of magnets 370 can provide for magnetic attraction sufficient to maintain the display assembly 200 in the portrait orientation and in the landscape orientation. In between, a combination of attraction and repulsion may exist. As an example, in the in between positions, magnetic attraction between the arrangement of magnets 270 of the magnetic coupling 250 and the arrangement of magnets 370 of the flap 350 may be sufficient to prevent falling (e.g., dropping) of the display assembly 200.

In the example of FIG. 4, electrical contacts 265 and 365 are also shown, which may be included where electrical connection is desired between a display assembly and a stand. As an example, the electrical contacts 265 and 365 can be rotational or stationary or, for example, a combination of rotational and stationary.

Figure 5:
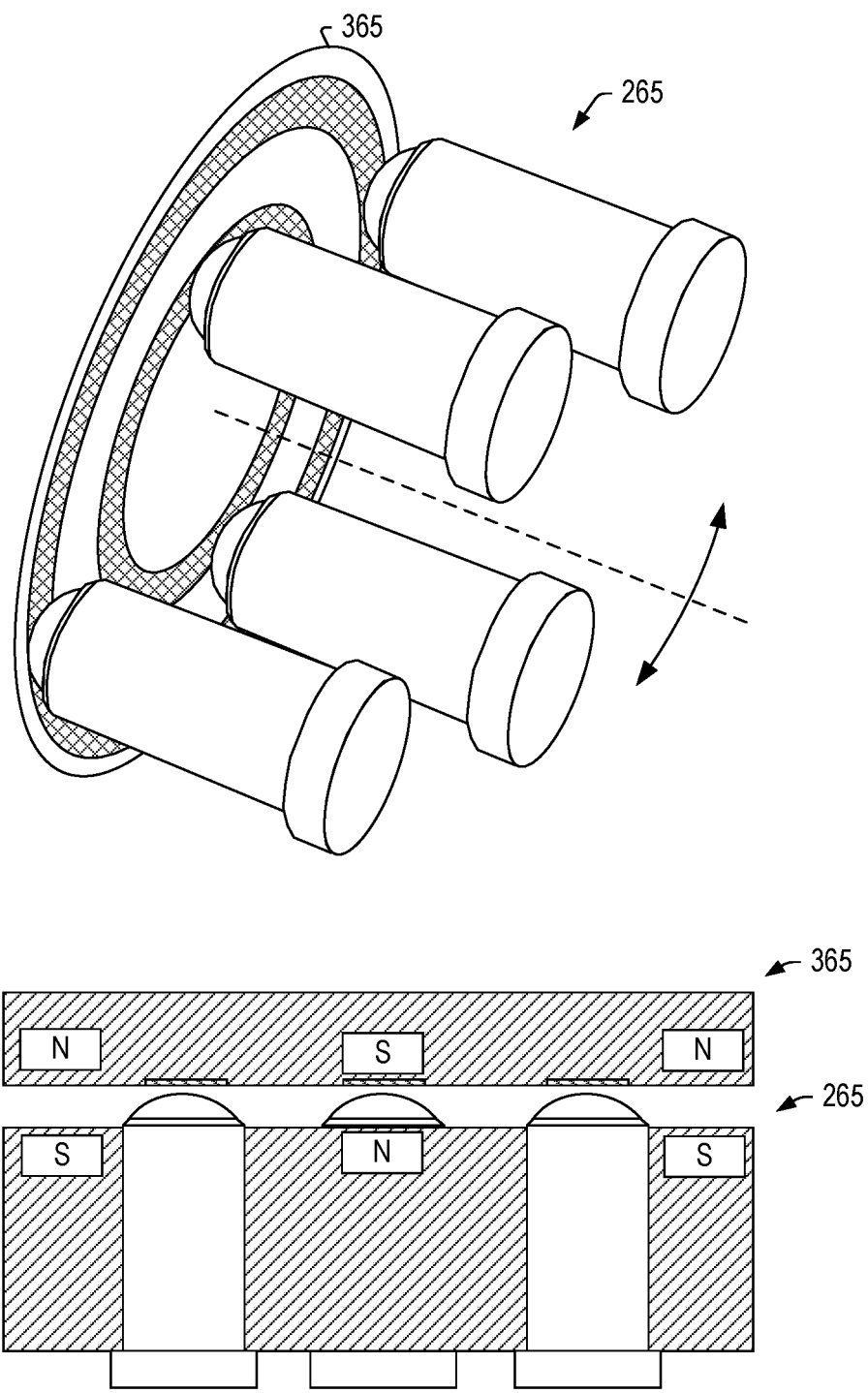
FIG. 5 is a perspective view and a cross-sectional view of examples of electrical contacts.

FIG. 5 shows a perspective view and a cross-sectional view of an example of the electrical contacts 265 and 365, noting that features for fewer or more electrical contacts may be provided. As shown, the electrical contacts 265 can include a number of spring-loaded balls disposed in cylindrical cases where they may be positioned in a holder that is rotatable, which may be rotatable upon rotation of a display assembly such as the display assembly 200. In such an example, with respect to the display assembly, the holder may be fixed. As shown, the electrical contacts 365 can include a number of races, which may include concentric races; noting that a race may be less than 360 degrees and/or may include segments (e.g., arc segments, etc.).

In the cross-sectional view of FIG. 5, magnets are shown, which may be included, for example, to maintain intimate contact between the electrical contacts 265 and 365. For example, one or both of the electrical contacts 265 and 365 may be movable in an axial direction such that a deviation in an axial distance between the flap 350 and the magnetic coupling 250 (e.g., due to magnetic repulsion, etc.) does not break an electrical connection between the stand 300 and the display assembly 200. For example, a user transitioning the display assembly 200 from one position to another by rotation of the display assembly 200 may not wish to experience glitches due to loss of an electrical connection. As an example, the magnets shown in the cross-sectional view of FIG. 5 may be for purposes of maintaining electrical connection and not for support of the display assembly 200 with respect to the flap 350.

As an example, the arrangements of magnets 270 and 370 may provide sufficient magnetic attraction force such that a gap does not result in disconnection. As an example, spring-loaded electrical contacts may have sufficient amount of movement in an axial direction to handle a gap or gaps that may occur during a transition of the display assembly 200 from one orientation to another orientation. As explained, one or more mechanisms may be utilized to assure electrical connection is maintained, where desired, during a transition (e.g., a 90 degree transition).

As explained, the stand 300 can include the flap 350 where the flap 350 includes an arrangement of magnets 370. And, the display assembly 200 can include a magnetic coupling 250 that includes an arrangement of magnets 270 where the arrangements of magnets 270 and 370 provide a magnetic attraction force that couples a rectangular housing of the display assembly 200 to the flap 350 in a first position and provide a magnetic attraction force that couples the rectangular housing of the display assembly 200 to the flap 350 in a second position, where, in the second position, the rectangular housing of the display assembly 200 is rotated by 90 degrees with respect to the first position. In such an example, the magnetic attraction force may be approximately the same in the first position and the second position or, for example, it may differ.

Figure 6:
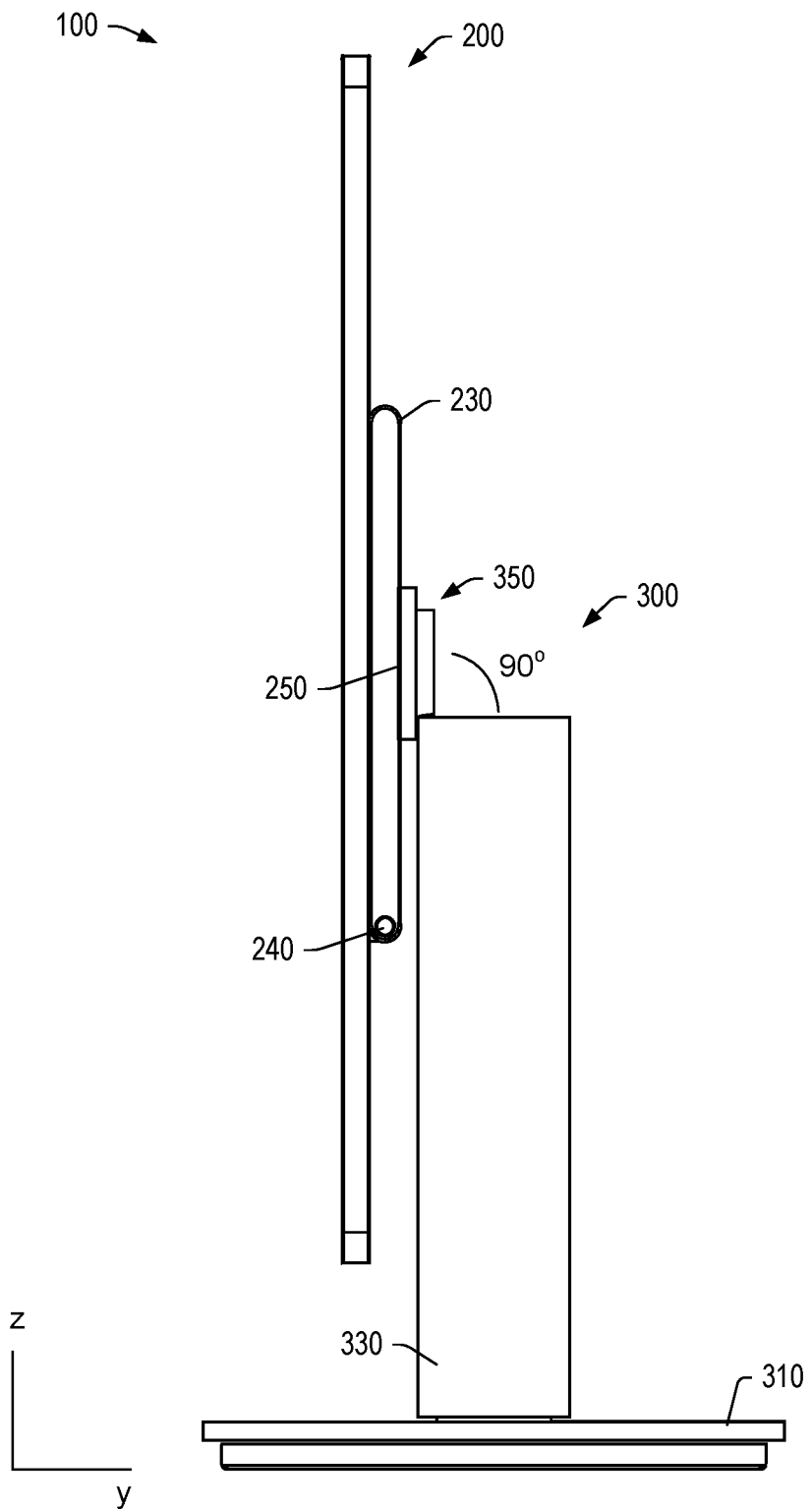
FIG. 6 is a side view of an example of a system.

FIG. 6 shows a side view of the system 100 as including the display assembly 200 and the stand 300 where the flap 350 is at an angle of approximately 90 degrees, as may be measured from the planar support 310.

Figure 7:
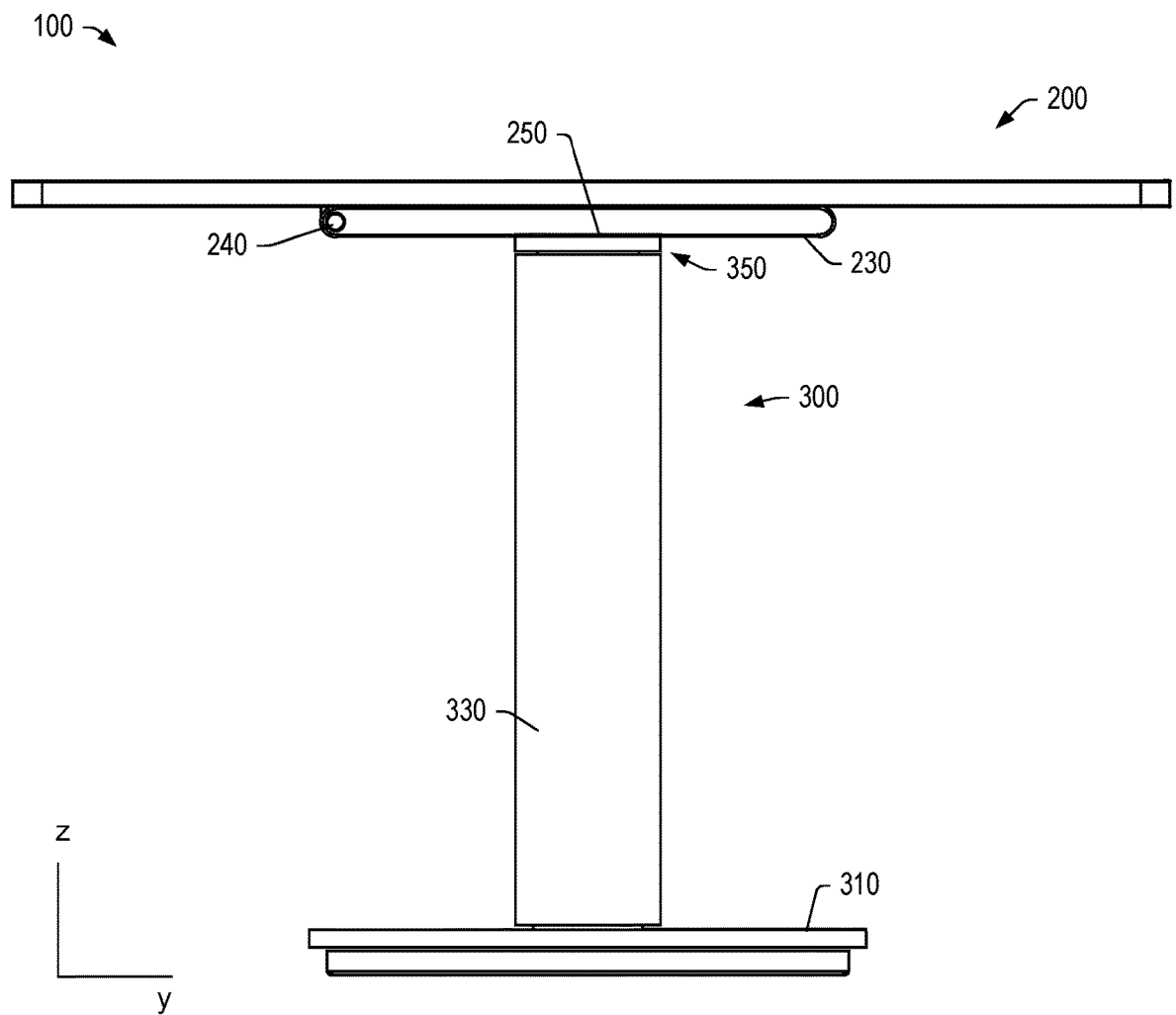
FIG. 7 is a side view of an example of a system.

FIG. 7 shows a side view of the system 100 as including the display assembly 200 and the stand 300 where the flap 350 is at an angle of approximately 0 degrees, as may be measured from the planar support 310 (e.g., the flap 350 can be parallel to the planar support 310). The orientation of FIG. 7 may be referred to as a table orientation of the display assembly 200, which can correspond to the flap 350 being in a closed position; whereas, in the example of FIG. 6, the flap 350 is in an open position.

Figure 8:
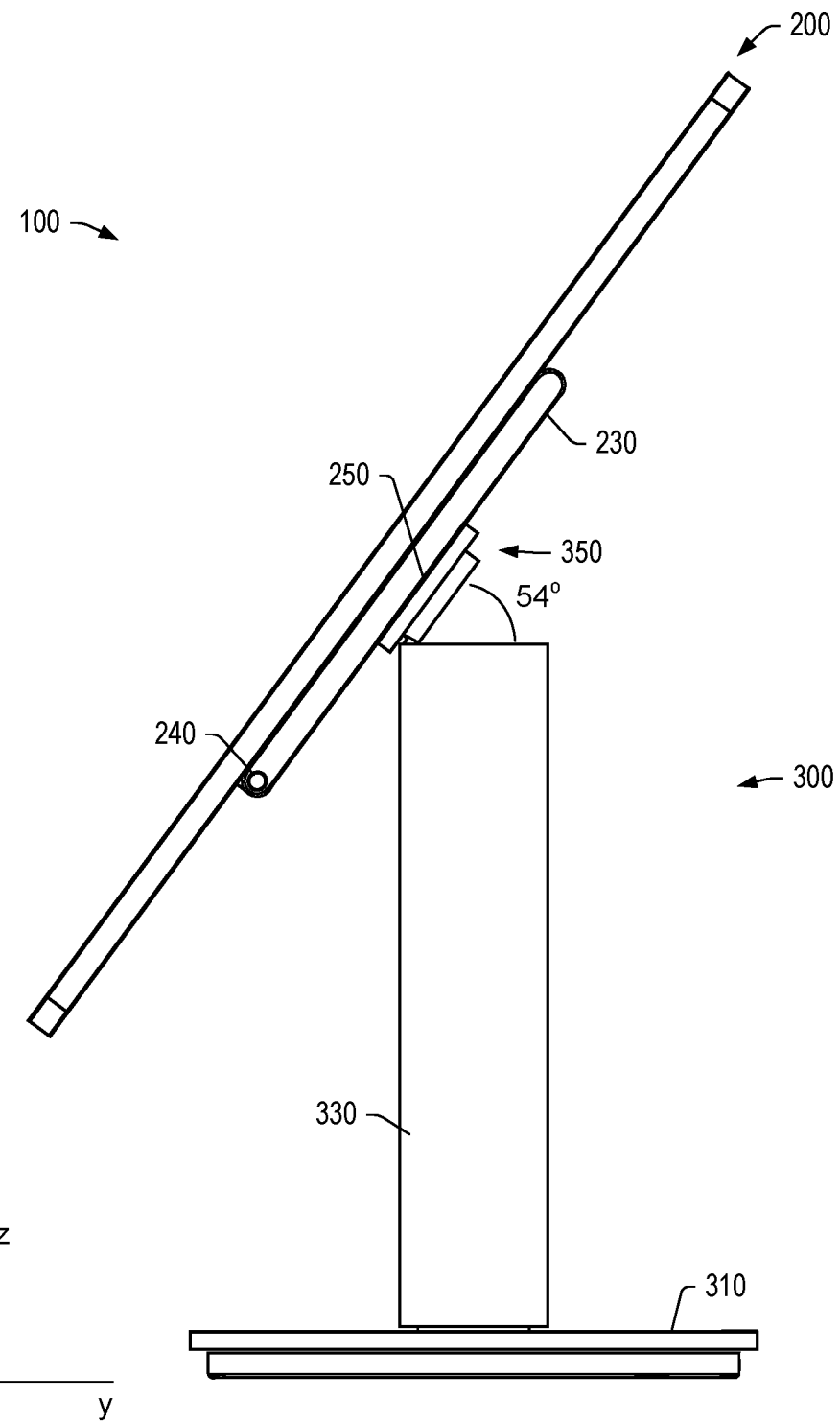
FIG. 8 is a side view of an example of a system.

FIG. 8 shows a side view of the system 100 as including the display assembly 200 and the stand 300 where the flap 350 is at an angle of approximately 54 degrees, as may be measured from the planar support 310. The orientation of FIG. 8 may be referred to as a tilted orientation of the display assembly 200.

Figure 9:
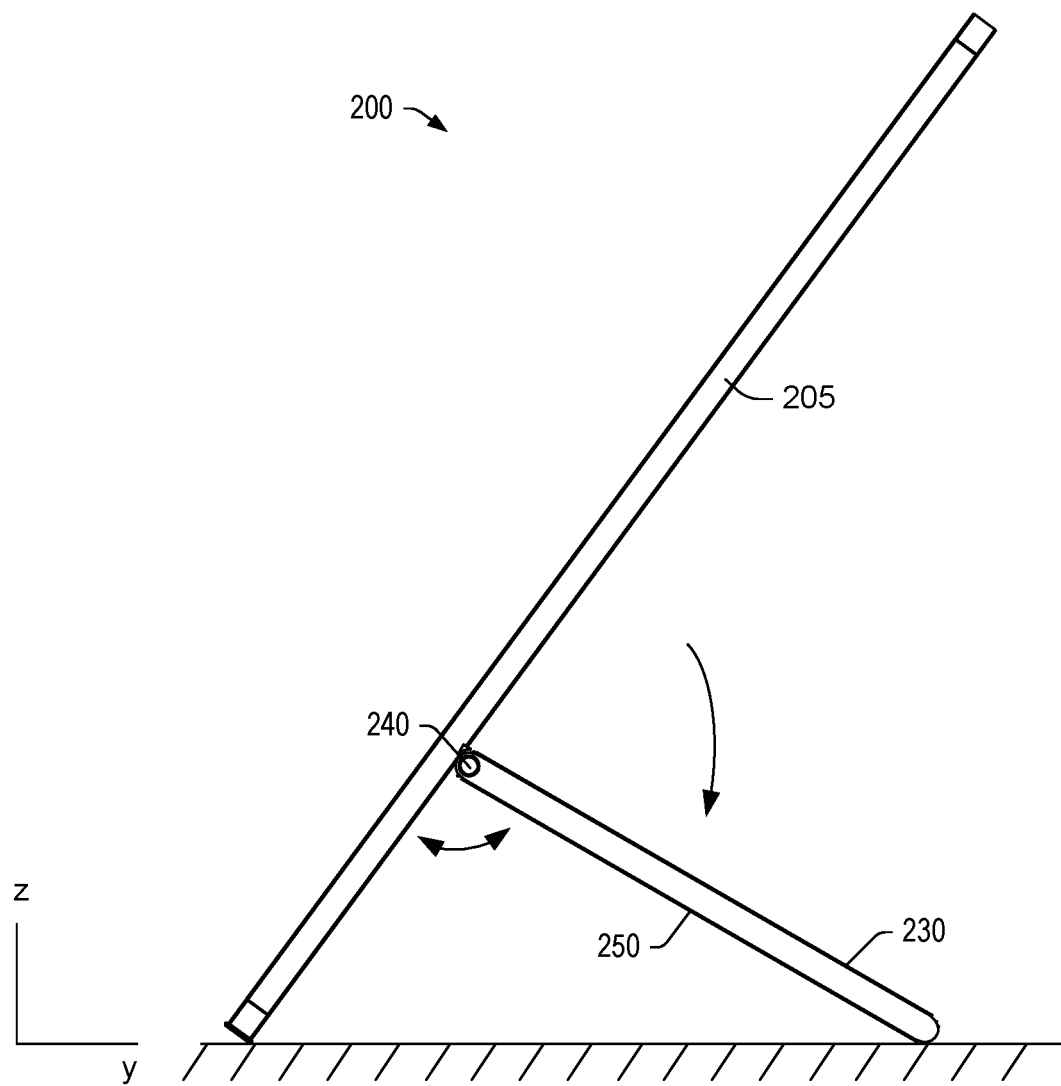
FIG. 9 is a side view of an example of a display assembly.

FIG. 9 shows an example of the display assembly 200 where the panel 230 is transitioned from being parallel to the frame 205 to being at an angle for support of the frame 205 (e.g., housing frame) at a desired angle. As indicated in FIG. 9, the magnetic coupling 250 may be substantially downward facing (e.g., facing a support surface).

Figure 10:
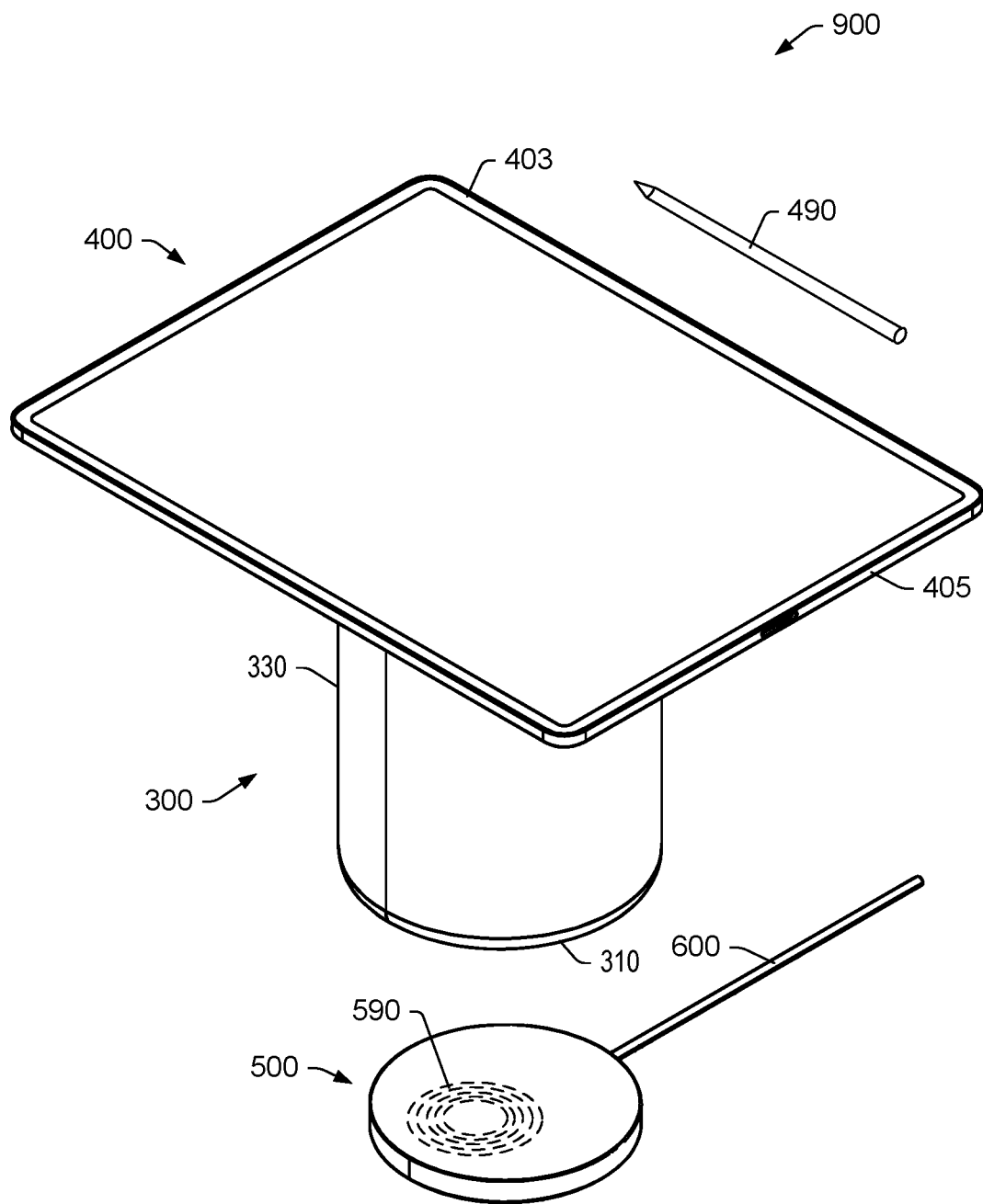
FIG. 10 is a perspective view of an example of a system.

FIG. 10 shows an example of a system 900 that includes an example of the stand 300 along with a computing device 400 that has a rectangular housing 403 as may be formed in part by a rectangular frame 405. In the example of FIG. 10, the computing device 400 may include one or more features as shown and described with respect to FIG. 1. For example, consider the one or more processors 105, the memory 106 accessible to at least one of the one or more processors 105, the display circuitry 107 and the one or more other components 108, which can include electronic circuitry, instructions stored in the memory 106 and executable by at least one of the one or more processors 105, etc.

In the example of FIG. 10, the system 900 can also include a stylus 490 and/or a power supply unit 500. For example, the stylus 490 may be attachable to the computing device 400 and/or the stand 300 may be positioned on the power supply unit 500 or, for example, the power supply unit 500 may be received at least in part by the stand 300 at the planar support 310, which may be an end of the base 330 and optionally integral to the base 330. As shown, the power supply unit 500 can include wireless charging circuitry 590 and may include or be coupled to a cable 600.

Figure 11:
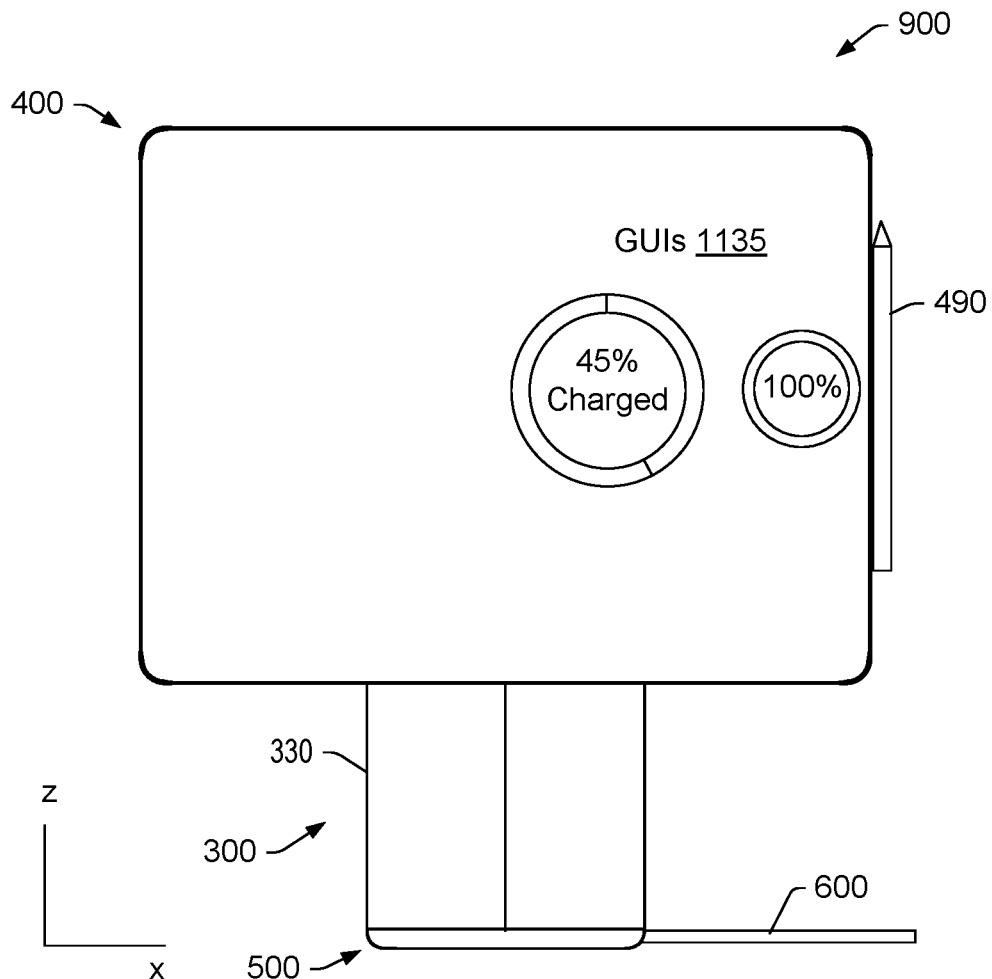
FIG. 11 is a perspective view of an example of a system and a block diagram of an example of a method.
Figure 11:
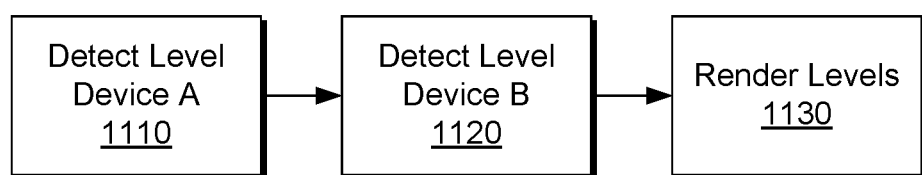

FIG. 11 shows a front view of the system 900 of FIG. 10 with the computing device 400 in a landscape orientation rather than in the table orientation of FIG. 10. In the example of FIG. 11, the power supply unit 500 is received in a bay of the stand 300 where the cable 600 may extend outwardly from the stand 300.

FIG. 11 also shows an example of a method 1100 that includes a detection block 1110 for detecting a power level of a device A, a detection block 1120 for detecting a power level of a device B and a render block 1130 for rendering the detected power levels. For example, the computing device 400 can be device A and the stylus 490 can be device B where graphical user interfaces (GUIs) 1135 are rendered to a display of the computing device 400. In the example of FIG. 11, the computing device 400 is shown to be at 45 percent charged while the stylus 490 is shown to be at 100 percent charged. In such an example, charging of one or more batteries can be via the power supply unit 500, which, as mentioned, can include or otherwise be coupled to the cable 600.

Figure 12:
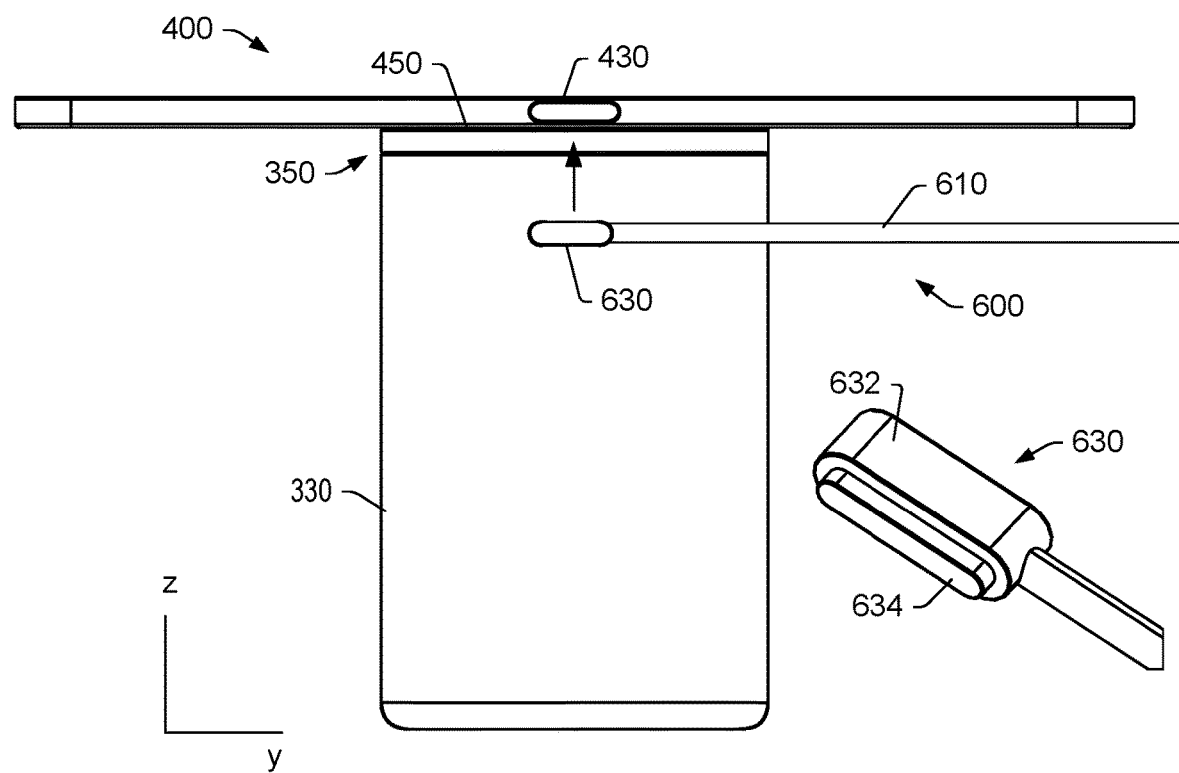
FIG. 12 is a side view of an example of a system.

FIG. 12 shows a view of the computing device 400 and the stand 300 where the cable 600 includes a plug 630 and a cord 610 where the plug 630 includes a head 632 with a connector 634. As an example, the plug 630 may include one or more magnets. For example, the computing device 400 can include a connector 430 where the plug 630 can couple to the connector 430 using a magnetic attraction force generated by one or more magnets of the plug 630.

In the example of FIG. 12, the stand 300 is shown as including the flap 350 and the computing device 400 is shown as including a magnetic coupling 450, which may provide for an arrangement of magnets such as the arrangement of magnets 270 of the display assembly 200. As an example, the computing device 400 may include electrical contacts such as, for example, the electrical contacts 265 and/or 365.

Figure 13:
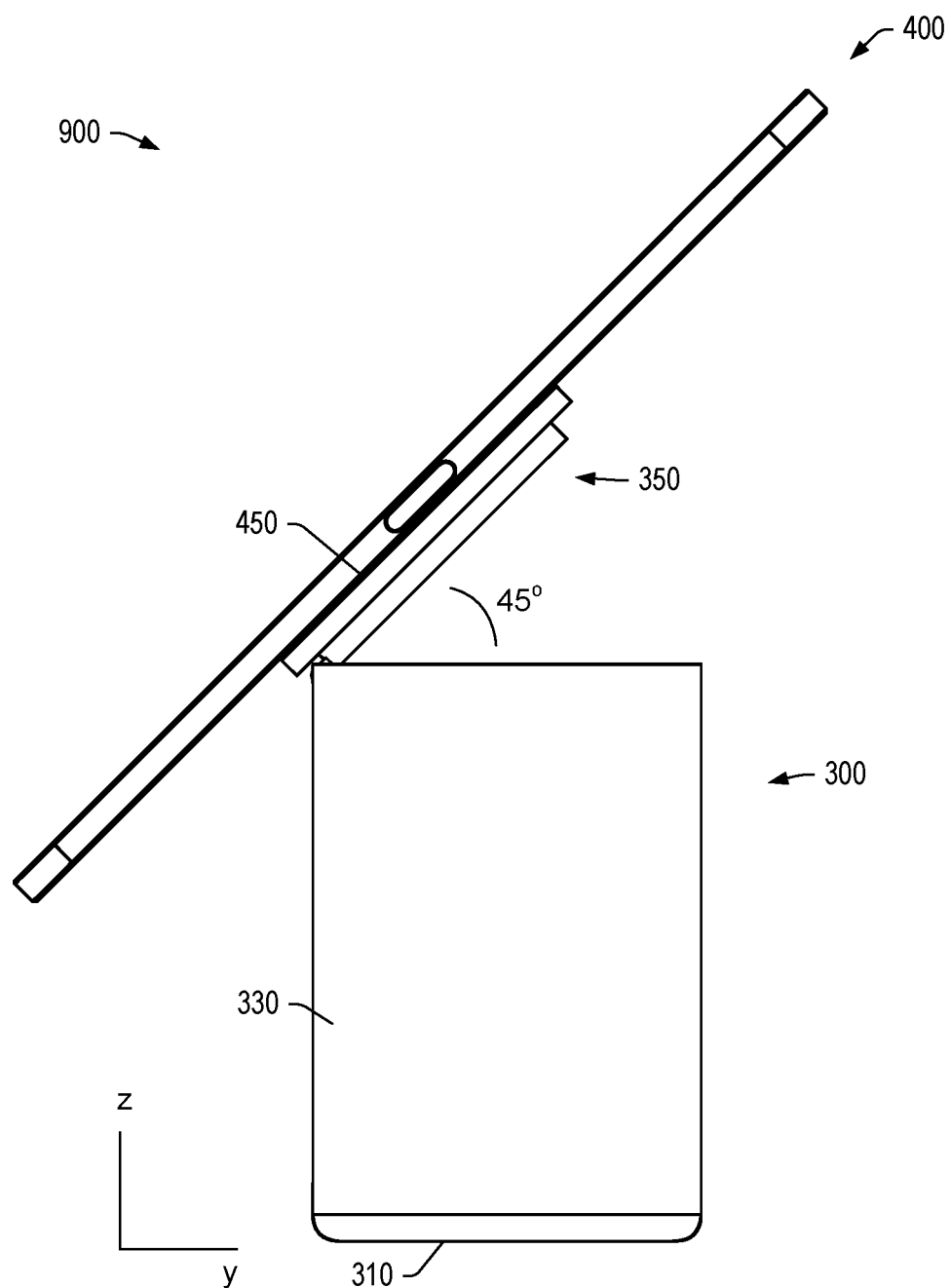
FIG. 13 is a side view of an example of a system.

FIG. 13 shows a side view of the system 900 as including the computing device 400 and the stand 300 where the flap 350 is at an angle of approximately 45 degrees, as may be measured from the planar support 310. The orientation of FIG. 13 may be referred to as a tilted orientation of the computing device 400; whereas, in FIG. 10, the orientation may be referred to as a table orientation of the computing device 400; noting that the orientation of FIG. 11 may be referred to as an upright orientation of the computing device 400. The computing device 400 can be rectangular with one set of sides longer than another set of sides such that a portrait orientation and a landscape orientation can be defined. As an example, the computing device 400 may be transitioned from a landscape orientation to a portrait orientation in the examples of FIG. 11 and FIG. 13.

Figure 14:
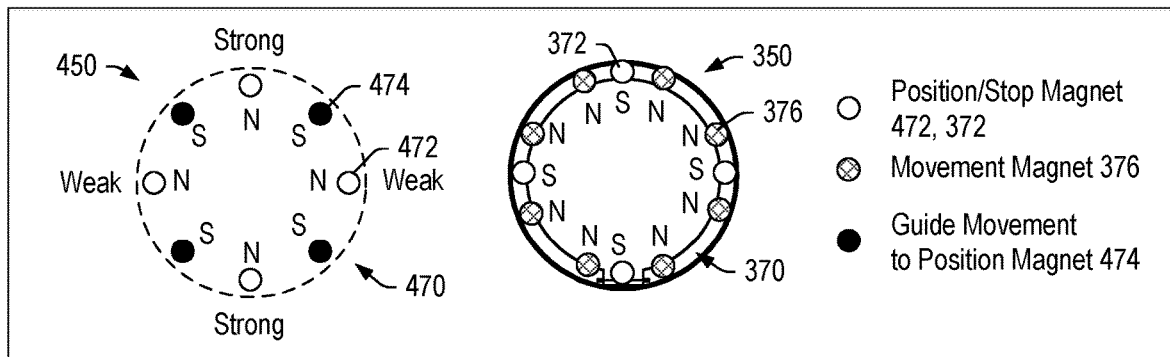
FIG. 14 is a series of views of examples of arrangements of magnets with respect to a display device and a stand.
Figure 14:
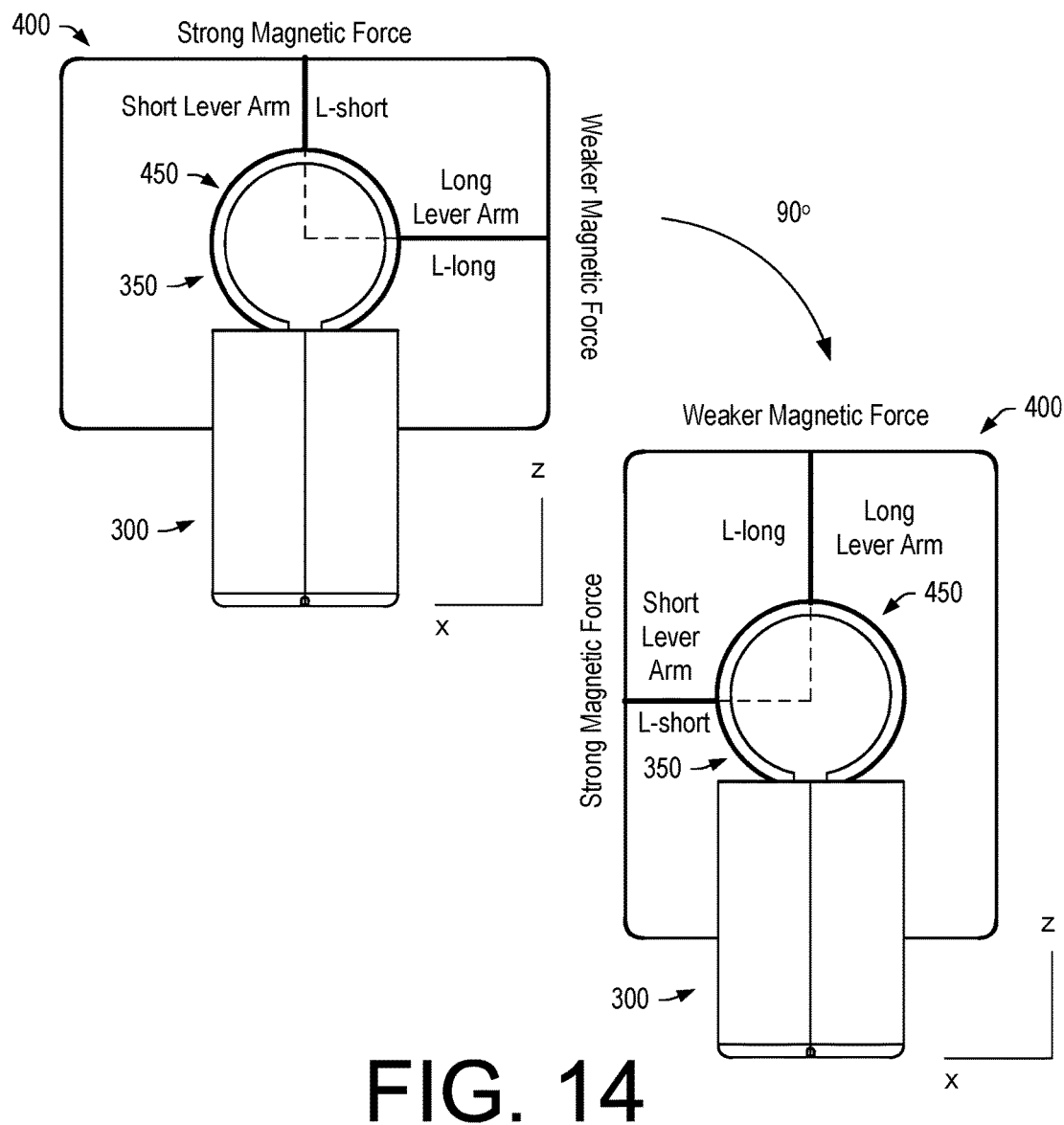

FIG. 14 shows an example of arrangements of magnets 370 and 470 and the computing device 400 in a landscape orientation (e.g., landscape position) and in a portrait orientation (e.g., portrait position). As explained with respect to FIG. 4, a magnetic coupling can include various magnets, which can include position or stop magnets, movement magnets and guide movement to position magnets. As shown in FIG. 14, the magnetic coupling 450 can include the arrangement of magnets 470 that can include magnets 472 and 474; while the flap 350 can include the magnets 372 and 376.

In the example of FIG. 14, asymmetry can exist for magnets and/or magnetic strength. For example, the horizontal magnets 472 can be weaker than the vertical magnets 472. In such an example, the weaker magnets can correspond to the shorter sides of the rectangular shaped computing device 400 while the stronger magnets can correspond to the longer sides of the rectangular shaped computing device 400. As shown, the computing device 400 can define a long lever arm with a length L-long and a short lever arm with a length L-short. In an example without magnetic force asymmetry, the longer length L-long may allow a user to more easily detach the computing device 400 from the flap 350 (e.g., to apply more leverage). However, with magnetic force asymmetry that provides weaker magnetic attraction force in the direction of the long lever arm, L-long, detachment becomes easier.

Figure 15:
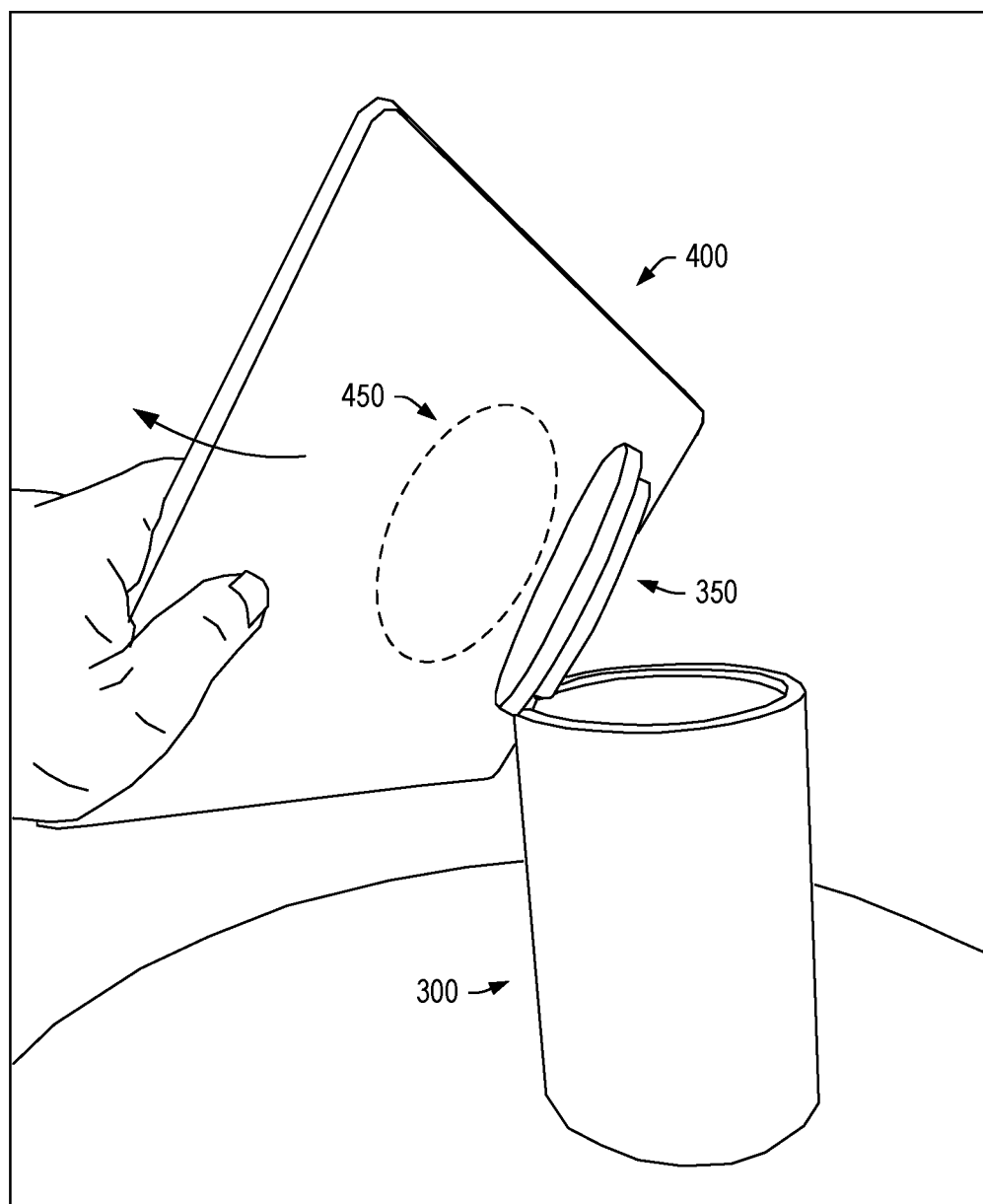
FIG. 15 is a perspective view of an example of a detachment of a display device from a stand.

FIG. 15 shows an example of the computing device 400 with respect to the stand 300 where the computing device 400 is grasped along a short side to allow for long lever arm leverage to detach the magnetic coupling 450 of the computing device 400 from the flap 350 of the stand 300. Such an approach can provide for more ergonomic use of the computing device 400 and the stand 300. For example, a user may grasp the computing device 400 along a short side with a thumb on a front side (e.g., a display side) or a back side of the computing device 400 and with a finger or fingers on an opposing side and then move the computing device 400 in a twisting manner such that a pulling force is applied between the magnetic coupling 450 and the flap 350 where a magnetic attraction force between the arrangements of magnets 370 and 470 is weaker. As an example, a user may utilize another hand to grasp the stand 300 such that the stand 300 remains stationary on a support surface (e.g., a desktop, a tabletop, a countertop, etc.). In such an approach, an angle of the flap 350 may remain fixed.

As an example, a user may transition a computing device 300 to a table orientation where the flap 350 of the stand 300 is closed. In such an example, pulling on the computing device 400 may not cause the flap 350 to open. In general, one orientation with one direction of pull may result in an opening force to be applied to the flap 350. Consider the short sides of the computing device 400 being parallel to a hinge axis where pulling force applied to the short side furthest from the hinge axis may cause the flap 350 to open. A user may experience such opening and then know to apply pulling force to the short side closest to the hinge axis. As mentioned, a hinge can be a friction hinge, which may provide a sufficient friction force such that risk of movement of the flap 350 responsive to application of a pulling force is minimal (e.g., the flap 350 remains stationary at a fixed angle, which may be an angle within a range of 0 degrees to 90 degrees). As an example, a flap 350 may provide for an interference fit with respect to the base 330. In such an example, the interference fit may provide an additional force that reduces risk of flap movement responsive to a pulling force to detach the computing device 400 from the flap 350. As an example, the flap 350 may include a latch that may lock the flap 350 in a closed position (e.g., for travel, storage, table orientation usage, etc.).

As to force applied to rotate the computing device 400 with respect to the flap 350, it may be applied in a manner that does not change an angle of the flap 350. For example, a rotational force to transition the computing device 400 from a portrait orientation to a landscape orientation may be experienced as a torque by the flap 350 that is in a planar direction rather than in an opening direction or a closing direction of the flap 350.

Figure 16:
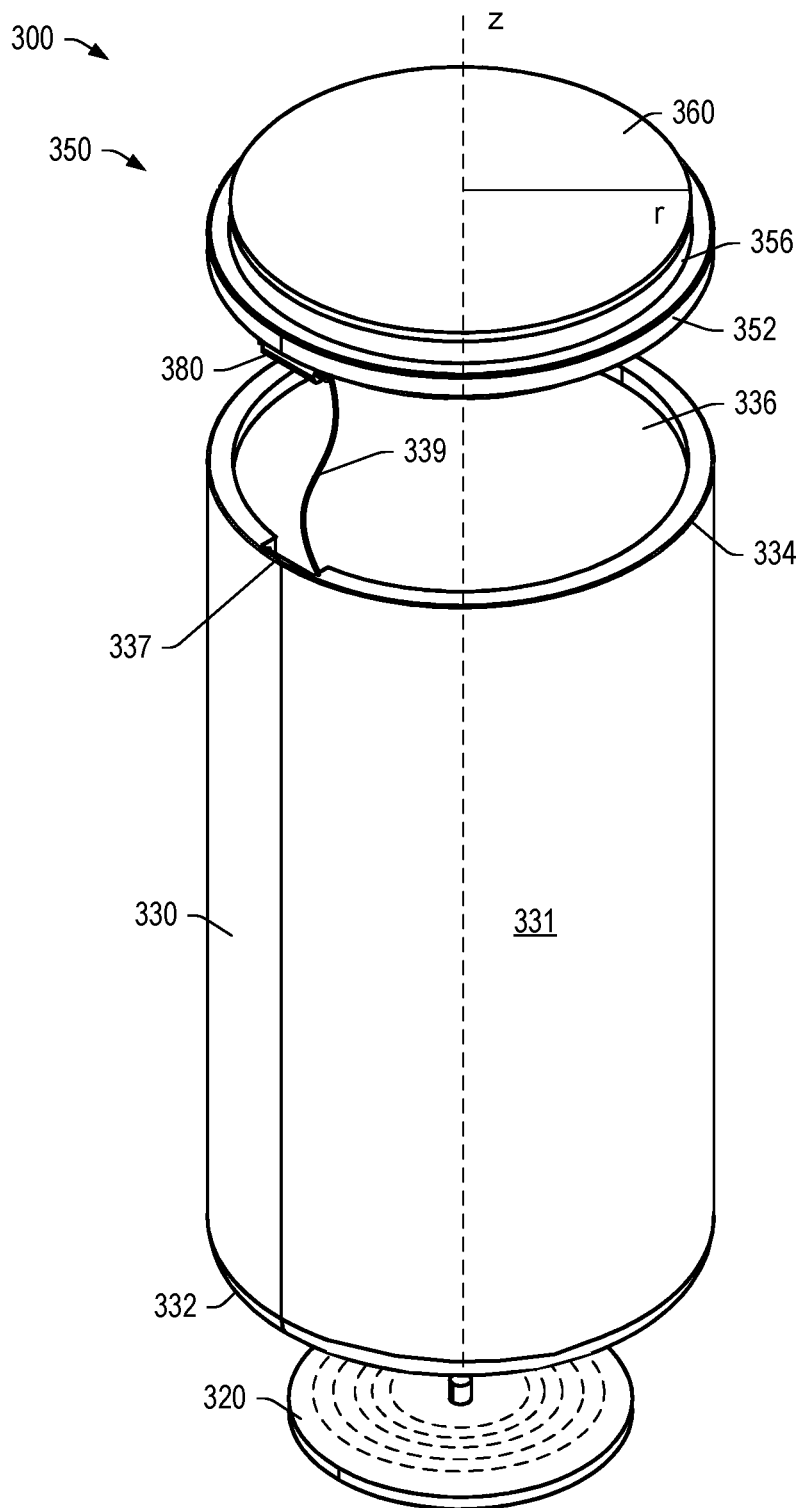
FIG. 16 is an exploded perspective view of an example of a stand.

FIG. 16 shows a perspective view of an example of the stand 300 where various features may be described with respect to a cylindrical coordinate system with a central z-axis, for example, to define axial positions, and an r-axis, for example, to define radial positions. As an example, an azimuthal coordinate (e.g., angular coordinate) may be utilized to define position of a feature. For example, the hinge slot 337 may define a 0 degree reference from which angles in a range from 0 degrees to 360 degrees may be utilized. In such an example, the flap 350 can include a hinge end at 0 degrees and an opposing end at 180 degrees, which may be referred to as an opening end.

In the example of FIG. 16, a base component 320 can be coupled to the base 330 where the base component 320 may include one or more features. As an example, the base component 320 can include circuitry, which may include wireless charging circuitry (e.g., an antenna, etc.), and/or can include a turntable, which can allow for rotation of the base 330 about the z-axis when the base 330 is supported on a support surface.

Figure 17:
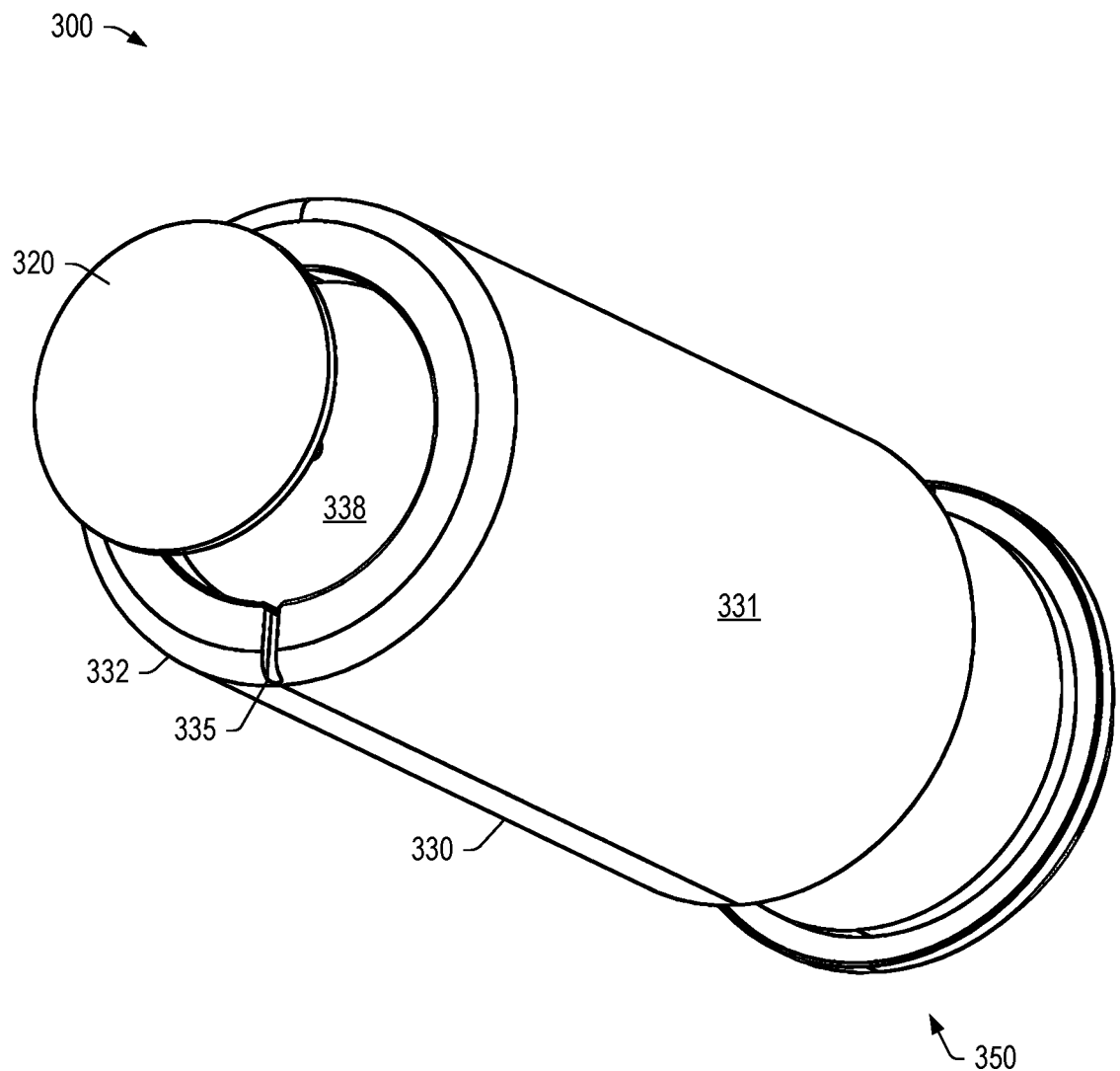
FIG. 17 is an exploded perspective view of an example of a stand.

FIG. 17 shows a perspective view of the example of the stand 300 of FIG. 16 where the base 330 includes a recess 338 at its lower end 332, along with a cable notch 335.

Figure 18:
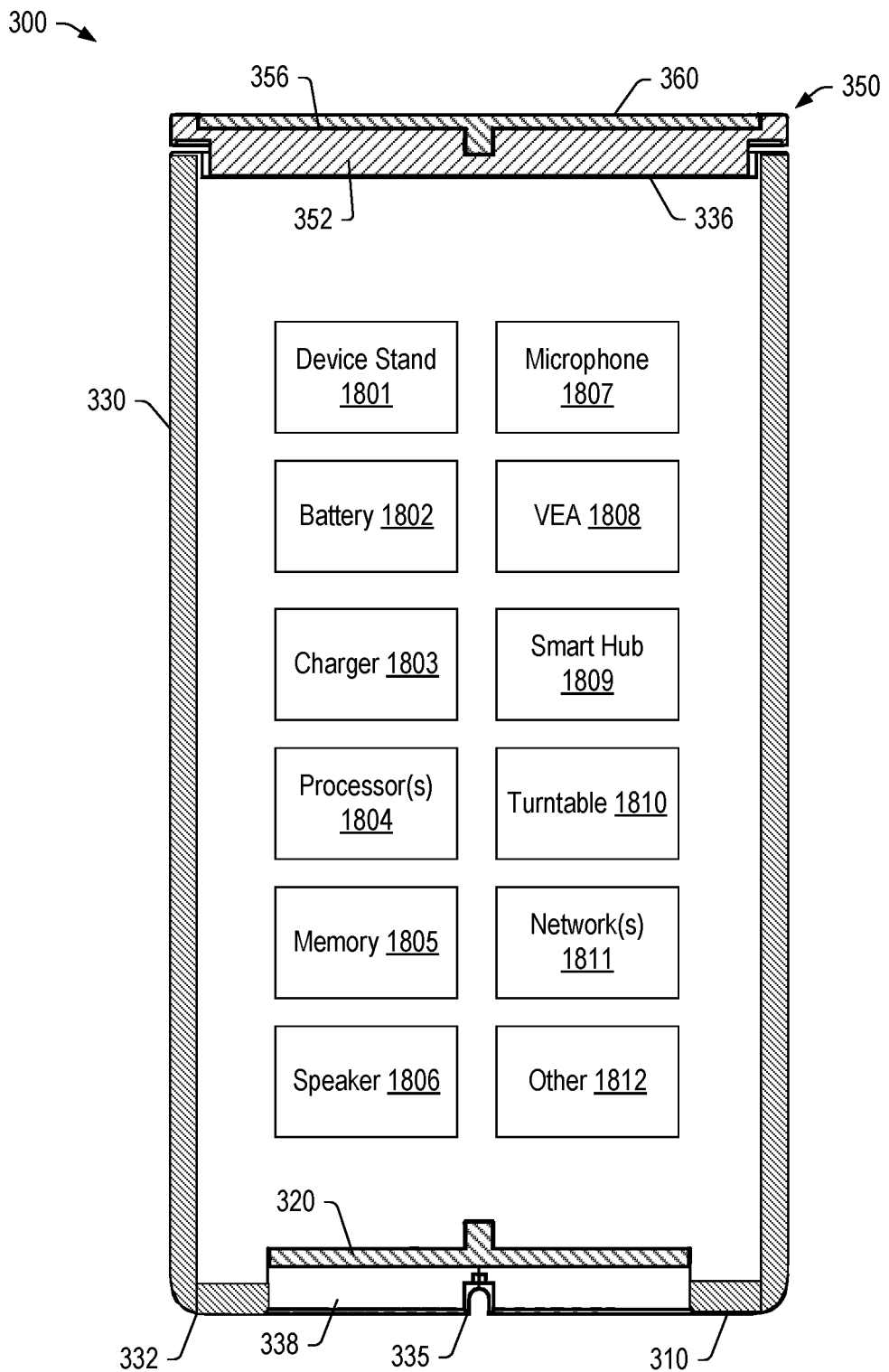
FIG. 18 is an approximate cross-sectional view of an example of a stand.

FIG. 18 shows an approximate cross-sectional view of an example of the stand 300. In the example of FIG. 18, the cap 360 and/or the hinged disk 352 can include one or more magnets and/or one or more electrical contacts (see, e.g., FIG. 4, FIG. 5 and FIG. 14).

Various blocks are shown in FIG. 18 as to some examples of features that the stand 300 may include. For example, consider a device stand 1801 for one or more devices, a battery 1802, a charger 1803, one or more processors 1804, memory 1805 (e.g., optionally removable), a speaker or speakers 1806, a microphone or microphones 1807, voice enabled assistant circuitry 1808, smart hub circuitry 1809, a turntable 1810, one or more network interfaces 1811 and/or one or more other features 1812.

As an example, the stand 300 can include ballast that may help to weigh down the stand 300. As an example, the recess 338 may couple to a planar support such as the planar support 310 of FIG. 3, which may be removable and/or replaceable depending on amount of support desired. As mentioned, the stand 300 can include the planar support 310 as shown in FIG. 10, which may be integral to the base 330. As an example, the stand 300 can include a number of planar supports of different shapes, sizes, weights, mechanisms, etc. For example, an integral planar support may be included where the recess 338 can accept another planar support as an accessory. As explained, a planar support may include a turntable mechanism (e.g., bearings in a raceway or raceways that provide for rotation of the stand 300). As shown in FIG. 3, a larger diameter planar support (see the planar support 310 of FIG. 3) can provide for an increased footprint or otherwise increased stability such that the flap 350 can accommodate larger and/or heavier devices with reduced risk of tipping. As shown in FIG. 10, the power supply unit 500 may be coupled to the stand 300 where a surface of the power supply unit 500 may serve as a planar support and/or augment the planar support 310.

In the example of FIG. 18, the base component 320 is shown as being received in the recess 338 in a manner where it does not extend to the end 332 of the base 330. In such an example, the base component 320 may be an adapter that can include circuitry, for example, to provide for wireless charging using the power supply unit 500, which may be received at least in part in the recess 338, where the cord 610 of the cable 600 can be received in the cable notch 335.

Figure 19:
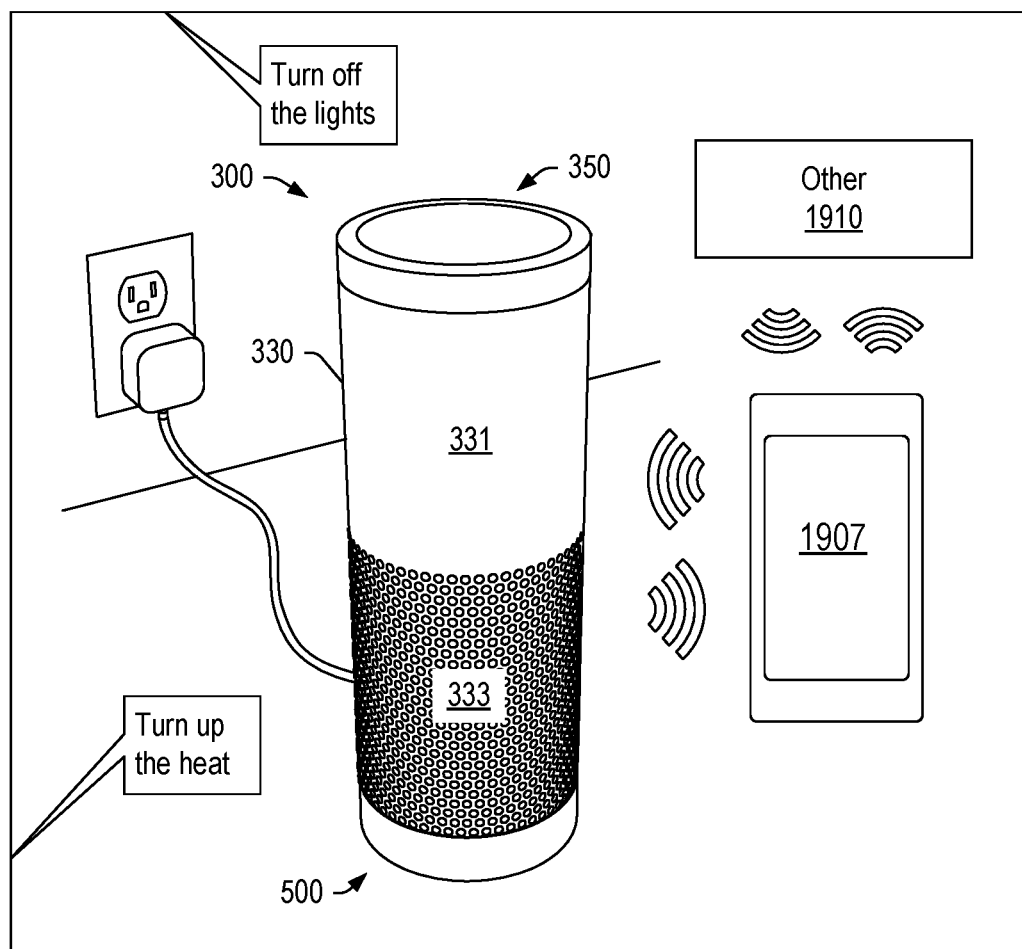
FIG. 19 is a perspective view of an example of a system.

FIG. 19 shows the stand 300 as including the power supply unit 500 where a portion of the base 330 can include openings 333 in the surface 331. In such an example, the openings 333 may provide for air movement, sound wave transmission, etc. For example, the openings 333 may function as a speaker grille for a speaker or speakers and/or as a microphone grille for a microphone or microphones.

As shown in FIG. 19, the stand 300 can operate as a voice-enabled assistant (VEA) via various types of circuitry. For example, the stand 300 can include one or more speakers (e.g., woofer, tweeter, etc.), one or more microphones (e.g., a microphone array), one or more lights, one or more volume controls, a remote control unit, a step-down regulator optionally with an integrated switcher, a lower power multichannel audio codec, an audio signal amplifier, a digital media processor, random access memory (RAM), flash memory, a Wi-Fi module, a BLUETOOTH module, an integrated power management integrated circuit (IC), one or more programmable multi-output LED drivers, one or more low power multichannel audio signal analog to digital converters (ADC), one or more dual positive-edge-triggered D-type flip-flops, etc.

As an example, a stand can include one or more features of a device such as, for example, the AMAZON ECHO device, which includes a woofer with a reflex port, a tweeter, a 7-microphone array, a light ring volume adjustment, a remote control, a Texas Instruments TPS53312 step-down regulator with integrated switcher, a Texas Instruments TLV320DAC3203 ultra low power stereo audio codec, a Texas Instruments TPA3110D2 15 W filter-free class D stereo amplifier, a Texas Instruments DM3725CUS100 Digital Media Processor (DMP), Samsung K4X2G323PD-8GD8 256 MB LPDDR1 RAM, SanDisk SDIN7DP2-4G 4 GB iNAND ultra flash memory, a Qualcomm ATHEROS QCA6234X-AM2D Wi-Fi and BLUETOOTH module, a Texas Instruments TPS65910A1 integrated power management IC, four Texas Instruments LP55231 programmable 9-output LED drivers, four Texas Instruments TLV320ADC3101 92 dB SNR low power stereo ADCs, Texas Instruments SN74LVC74A dual positive-edge-triggered D-type flip-flops, and seven S1053 0090 V6 microphones.

As an example, a stand can include circuitry that can offer weather from a weather service and news from a variety of sources, including local radio stations, BBC, NPR, and ESPN from a service provider. As an example, a stand can include circuitry that plays music from an account holder's one or more accounts with digital music providers and a device may include built-in support for streaming music services like IHEARTRADIO, PANDORA, SIRIUS XM, SPOTIFY and APPLE music, among one or more others. As an example, a stand can include circuitry that provides support for IFTTT and NEST thermostats and/or one or more other environmental controllers for a site (e.g., HVAC controllers, etc.). As an example, a stand can include circuitry that can play music from a music streaming service such as GOOGLE PLAY MUSIC, for example, from a smartphone and/or a tablet via a short-range communication link (e.g., BLUETOOTH, etc.) and/or via one or more other types of connections.

In the example of FIG. 19, the stand 300 may communication directly and/or indirectly with one or more other devices 1907 and 1910, which may be local and/or remote. Referring to the example of FIG. 10, upon attaching the computing device 400 to the stand 300, the stand 300 can be transformed into a more complex system. For example, a display of the computing device 400 can be utilized to render one or more graphics, graphical user interfaces, etc. Such a system can readily provide for ease of control of devices, systems, etc., with enriched visualization compared to the stand 300 by itself, which may or may not include its own display. In the example of FIG. 10, the computing device 400 is shown as having a tablet form factor, noting that it may have a cellular phone form factor.

Figure 20:
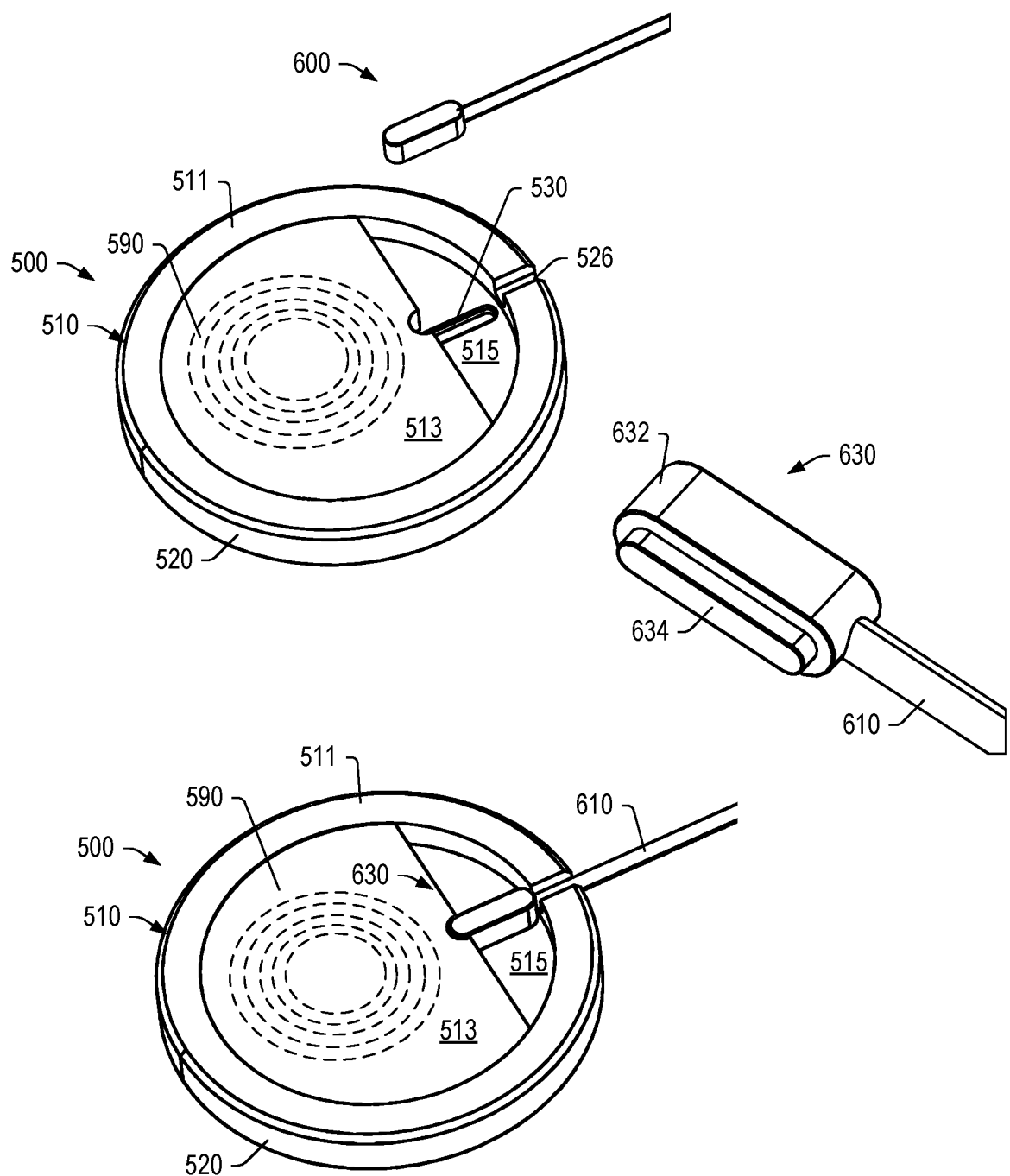
FIG. 20 is a series of perspective views of an example of a power supply unit and an example of a cable.

FIG. 20 shows perspective views of an example of the power supply unit 500 and the cable 600. As shown, the power supply unit 500 can include a bottom surface 510 that may be formed by a circular body 520 that can include circuitry such as, for example, the wireless charging circuitry 590. As shown, the power supply unit 500 can include a connector 530 that can mate with a portion of the plug 630 of the cable 600. As explained, the plug 630 can include the head 632, which includes the connector 634. The connectors 530 and 634 can mate to form an electrical connection that may be suitable for transmission of power and/or data. In the example of FIG. 20, the circular body 520 can include a cable notch 526 that can accommodate the cord 610 of the cable 600.

In the example of FIG. 20, the circular body 520 can include a recessed portion 515 where the connector 530 is disposed in the recessed portion. In such an example, the plug 630 may be flush with the bottom surface 510 or, for example, slightly recessed therefrom. As an example, the bottom surface 510 may include an annular surface 511 that defines an outer perimeter and an inner perimeter where a planar surface 513 of the bottom surface 510 is within the inner perimeter and slightly recessed (e.g., a millimeter to a centimeter). As shown, the planar surface 511 can form a step with respect to the recessed portion 515 and, for example, the planar surface 511 can form a step with respect to the annular surface 511. As an example, one or more features may help to reduce risk of the plug 630, when present, from catching or rubbing on a support surface (e.g., a desktop, a tabletop, a countertop, etc.). As explained, the head 632 of the plug 630 may be received by the power supply unit 500 where a surface of the head 632 opposite the connector 634 does not contact a support surface, for example, by being recessed with respect to the annular surface 511 of the power supply unit 500.

As an example, the power supply unit 500 can include a turntable, which may include bearings, a raceway or raceways, an axle, a bushing, etc. As an example, a base may be rotatable about its axis via a power supply unit that includes a turntable. As mentioned, a base may include a turntable or be fit with a turntable as an accessory.

As an example, the power supply unit 500 may include an antenna that is centered such that it aligns with another antenna as disposed in the base 330 of the stand 300. In such an example, if the base 330 rotates about its axis with respect to the power supply unit 500, the antennas can remain aligned for transfer of power and/or other information (e.g., consider a handshake, etc., according to the Qi standard).

Figure 21:
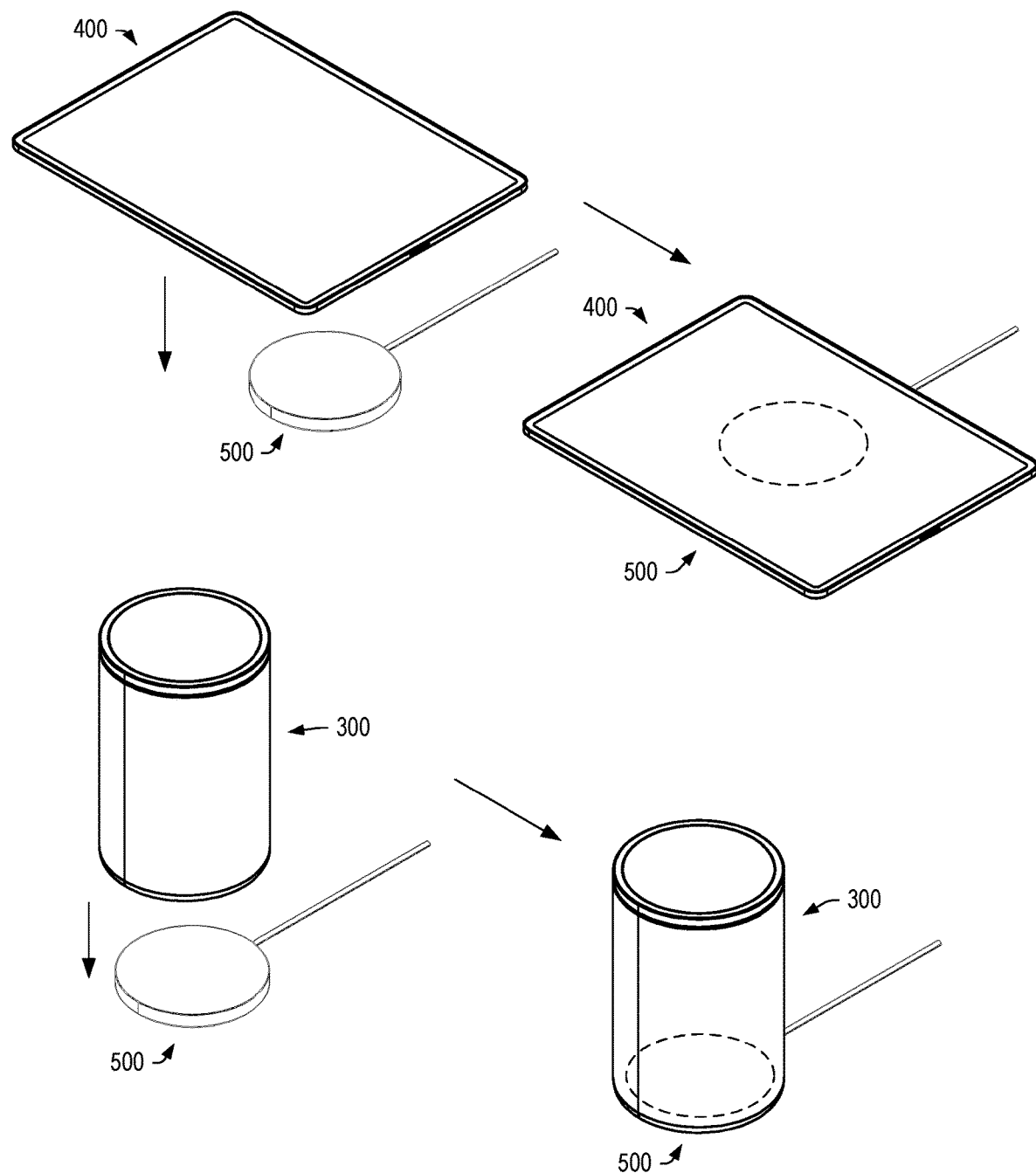
FIG. 21 is a series of perspective views of example methods of coupling devices of systems.

FIG. 21 shows examples of transitions of the computing device 400 and the stand 300 with respect to the power supply unit 500. As shown, the computing device 400 may be positioned directly on the power supply unit 500 such that the computing device 400 can be supplied with power. As explained, the stand 300 may be positioned with respect to the power supply unit 500 to be supplied with power. As explained, the stand 300 may stack onto the power supply unit 500 via a recess in the stand 300, where, for example, the stand 300 may include a receiving antenna and associated circuitry, which may be integral or added via an accessory (see, e.g., the base component 320).

In FIG. 21, dashed circles indicate approximate positions of the power supply unit 500 with respect to the computing device 400 and the stand 300 when they are joined together as a system. As explained with respect to FIG. 10, the stand 300 may stack onto the power supply unit 500 and the computing device 400 may stack onto the stand 300. In such an example, the power supply unit 500 can provide power to the stand 300, for example, if the stand 300 includes circuitry (e.g., a battery or other circuitry), and can provide power to the computing device 400, which may be indirectly via the stand 300. As explained, one or more electrical contact types of connectors may be utilized, which may provide for transmission of power and/or data between a power supply unit, a stand, a computing device, an accessory, etc.

As mentioned with respect to FIG. 11, the stylus 490 may be charged via power supplied by the power supply unit 500. In the example of FIG. 11, if the stand 300 includes a battery or batteries, the GUI 1135 may include a graphic or graphics for state of charge of the battery or batteries. In such an approach, a user can be informed as to whether the cable 600 is needed to continue use of the computing device 400 as mounted to the stand 300. For example, a user may see that the stand 300 and/or the computing device 400 have sufficient charge for disconnecting the cable 600 such that the stand 300 and the computing device 400 can be utilized as a system that is mobile. In such an example, the user may move the stand 300 and the computing device 400 as a system to another room, from a table to a counter, from a desk to a utility room, etc. Where the stand 300 includes VEA functionality or other hub functionality, the stand 300 and computing device 400, as a system, can be transported to equipment, which may be part of an IoT system. Such an approach may allow for local interactions where settings, operations, etc., may be performed on the equipment while observing information on a display of the computing device 400; noting that the computing device 400 may be used to access the Internet for information on a manufacturer's website, for videos, etc., which may include instructions as to how to set up equipment. For example, consider an air handler of a heating and/or cooling system where the air handler has buttons, knobs, jumpers, etc., which can be adjusted. In such an example, a user can bring the stand 300 and the computing device 400 as a system to the air handler and make adjustments to the air handler to establish hub-based control (e.g., a handshake, a pairing, etc.), optionally while following a video rendered to the display of the computing device 400. Once a task is completed, the user may transport the stand 300 and the computing device 400 as a system to another location where the air handler can be monitored, controlled, etc., for example, via a GUI rendered to the computing device 400 and/or via commands received by the stand 300 (e.g., where the stand 300 itself includes hub or VEA circuitry). As an example, the user may detach the computing device 400 from the stand 300 (see, e.g., FIG. 15) and utilize circuitry of the stand 300 for acting on voice commands (see, e.g., the example of FIG. 19 such as "turn up the heat").

As mentioned with respect to FIG. 12, the cable 600 can be used with a computing device such as, for example, the computing device 400. As explained with respect to the example of FIG. 12, the cable 600 may provide power to the computing device 400 whether or not the computing device 400 is coupled to the stand 300. As explained, the cable 600 may be a multi-function cable in that it can couple to one or more devices for transmission of power and/or data.

Figure 22:
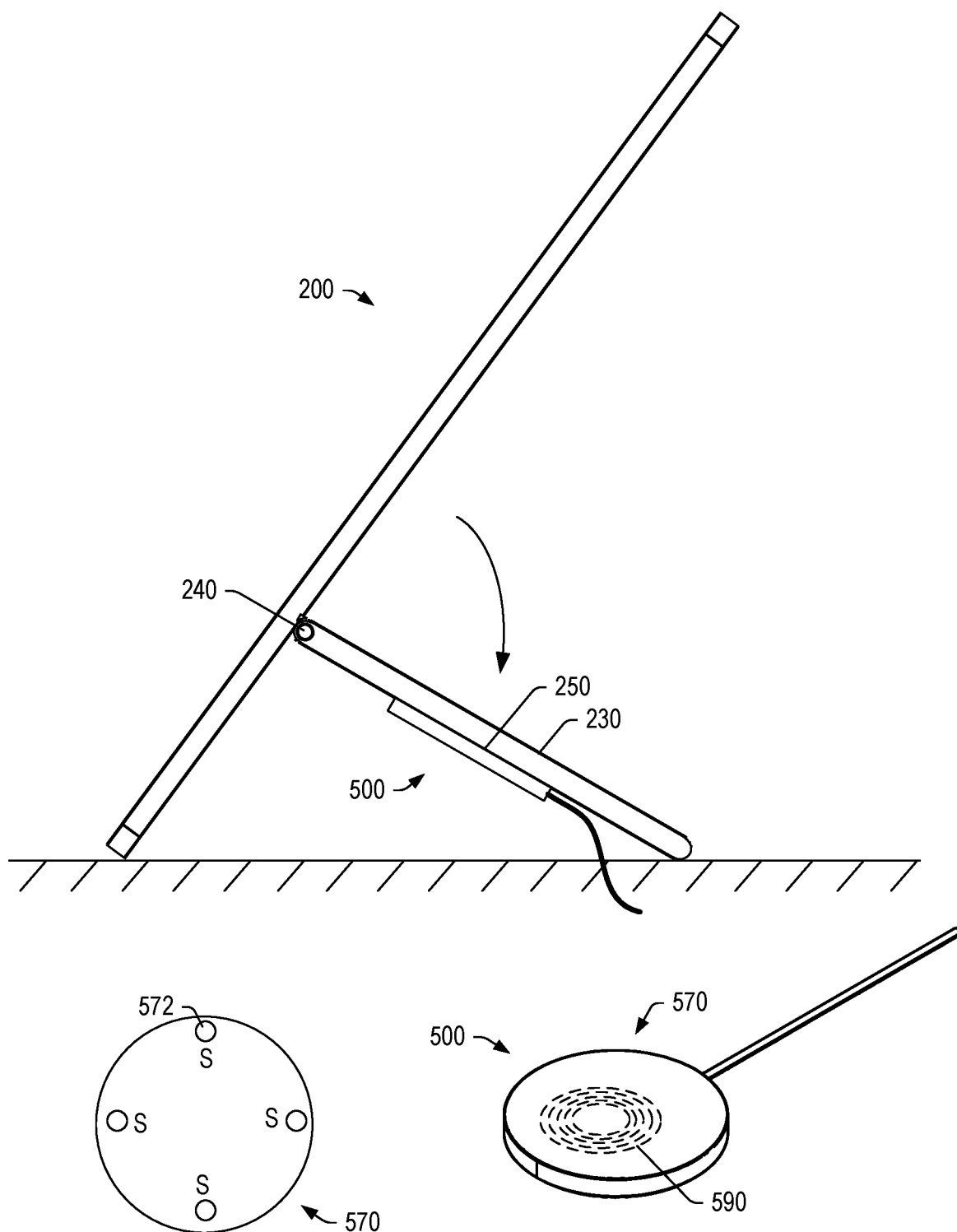
FIG. 22 is a series of views of an example of a system.

FIG. 22 shows a side view of an example of the display assembly 200, which, as mentioned, may be a computing device. As an example, the panel 230 of the display assembly 200 may include circuitry such as a processor, memory, etc., where the display 202 is electronically, operatively coupled to the processor. In the example of FIG. 22, the power supply unit 500 can include an arrangement of magnets 570 where position or stop magnets 572 are included that can establish a magnetic attraction force with corresponding magnets of the magnetic coupling 250 of the display assembly 200. In such an example, the power supply unit 500 can provide power to the display assembly 200 such that information may be rendered to the display 202 (e.g., using the display circuitry 107 as in FIG. 1). While the display assembly 200 of FIG. 22 is shown at an angle according to a position of the panel 230 as rotated about the hinge 240, the power supply unit 500 may be utilized when the panel 230 is not rotated, for example, in a closed position where the panel 230 is parallel to the frame 205 of the display 202.

A device and a stand, as a system, can utilize arrangements of magnets for coupling to the device to the stand in one or more orientations and, for example, for transitioning the device from one orientation to another orientation, which may be a guided transition using various magnets.

As an example, arrangements of magnets can provide for coupling a device to a stand and/or to a power supply unit. In such an example, the device can be a slate screen type of device that can include an arrangement of magnets, which may include some that are symmetrically arranged and/or asymmetrically arranged; noting that polarity and/or strength can be factors. As an example, a device can be brought into proximity to a stand where arrangements of magnets act to magnetically anchor the device to the stand in one of two positions. For example, consider a device and a stand where the device can be oriented in a landscape orientation or can be oriented in a portrait orientation by precise magnetic guidance. Such a system may also provide for guided rotation of the device with respect to the stand and, for example, the stand can include a hinged magnetic coupling (e.g., consider a hinged flap with an arrangement of magnets). A hinged magnetic coupling of a stand may provide for moving a device in one or more additional degrees of freedom, for example, from a table orientation, to a tilted orientation, to a vertical orientation. In such example orientations, gravity may be normal to a display of the device (e.g., 0 degrees), then at an angle and finally aligned with the device (e.g., 90 degrees). In such orientations, the device may also be rotated about the hinged magnetic coupling while the hinged magnetic coupling may remain stationary. Movements of a device may be defined by rotational movement about a common axis of arrangements of magnets and/or may be defined by hinged movement about a hinge axis of a body that carries one of the arrangements of magnets (e.g., consider the flap 350 and the arrangement of magnets 370).

As explained, with respect to rotational movement of a rectangular device with respect to a stand, such rotational movement may be about a center point of the rectangular device that may be defined by mid-points of two sides of a rectangular frame of the rectangular device. In such an example, the rotational movement may be unlimited as to number of degrees in a clockwise direction or a counter-clockwise direction or, for example, arrangements of magnets may limit such rotational movement to a range from 0 degrees to 90 degrees and back again, which may correspond to transitions between landscape and portrait orientations.

As explained, magnets may be provided that can guide movement of a device with respect to a stand. In such an example, arrangements of magnets of a device and a stand can provide a feel and function akin to a mechanical turntable mechanism where a user may not be aware that arrangements of magnets are being utilized rather than a mechanical linkage between the device and the stand. As a system can be without a mechanical linkage between a device and a stand, a user may readily detach the device from the stand in a tool-less manner using manually applied force, which may be to the device or to the device and to the stand.

As explained, arrangements of magnets can provide for rotational movements with stops at 0 degrees and at 90 degrees or, for example, at 0 degrees, 90 degrees, 180 degrees and 270 degrees. Such magnets may be referred to as position or stop magnets as they may hold a position of a device with respect to a stand or stop movement of a device with respect to a stand.

As to a device and a stand and/or a power supply unit as a system, which may be a computing system, the system may operate in different operational modes. For example, consider a docking mode that allows a device to receive power by fixing the device to a proper position on a stand that includes a wired and/or a wireless power connector or a power supply unit that includes a wired and/or a wireless power connector. A rotational mode may be provided where a device can be coupled to a stand where the device can rotate around a central axis of the device using magnetic coupling in a manner as if the device and the stand were mechanically coupled (e.g., using bolts, screws, etc.).

As explained, power may be transferred using one or more types of circuitry that may be amenable to rotation. For example, a wireless technique may be amenable to rotation where antennas are suitable shaped and/or a wired technique may be amenable to rotation where electrical contacts can maintain contact during rotation of a device with respect to a stand and/or a power supply unit.

As explained, arrangements of magnets may provide for ergonomics such as ergonomic ease of decoupling a device from a stand. As an example, a device may be rotatable with respect to a stand via arrangements of magnets that may be configured to allow for single handed rotation to transition the device between different orientations (e.g., landscape and portrait). As explained, a user may wish to decouple a device from a stand, optionally by using a single hand. In such an example, arrangements of magnets can provide for an asymmetry such that a rectangular device is easier to decouple when grasped and pried away from a stand along a short side, which can provide for a longer lever arm (e.g., greater leverage) compared to a long side. In such an example, the arrangement of magnets of the device may be substantially centered on a back side of the rectangular device to define two lever arms (e.g., a short one and a long one). As an example, arrangements of magnets can include weaker magnets and/or an arrangement of magnets that results in lesser magnetic attraction force along a direction between opposing short sides of a rectangular device. In such an approach, the rectangular device can be more easily detached (e.g., decoupled) from a stand when the rectangular device is grasped at a short side and pulled forward away from the stand, which may cause the rectangular device to "peel" away from a magnetic coupling of the stand (e.g., a flap of the stand). Such an approach may be amenable to single handed detachment of a device from a stand where the device and the stand are magnetically coupled. In comparison, for a two handed approach, a user may grab two opposing sides of a rectangular device, which may result in force being applied to a stand that may displace or otherwise move the stand such that some of the force is essentially wasted by being carried over to the stand. As an example, arrangements of magnets of a device and a stand can provide for ease of decoupling the device from the stand by applying force to one side rather than to two opposing sides. As explained, such an approach can take advantage of a lever arm for leverage where a device can peel away at an angle rather than lift directly away (e.g., in a parallel manner between two arrangements of magnets).

By using a single hand rather than two, a person may be more balanced as the person's center of gravity can shift by a lesser amount. For example, when two hands are used, the person's torso may move forward thereby resulting in a substantial forward shift in the person's center of gravity, which may put the person at risk of falling forward. With a single handed approach, a person can extend one hand forward while optionally tilting the opposite shoulder backward such that the torso of the person twists to maintain a more stable position (e.g., a more favorable center of gravity). Further, a person may be holding some other object in the other hand or, for example, a person may have only a single hand. As explained, various features can provide for improved ergonomics, particularly as to optional single hand manipulation of a device with respect to a stand.

As explained, arrangements of magnets can provide for varying strength for rotation and/or detachment of a device with respect to a stand. As explained, combinations of poles may provide for magnetic attraction and/or magnetic repulsion, which may be position dependent (e.g., depend on position of a device with respect to a stand). Such an approach can provide an adequate magnetic attraction force such that a device does not fall off a stand due to a gravity related force (e.g., F=mg) and also provide for ease of rotation and/or ease of decoupling the device from the stand given a particular direction of force (e.g., a pulling force applied along a single side of the device such that the device peels away). As an example, an arrangement of magnets can include magnets of different strength at up and down angles that can hold a device in a desired position on a stand while and applied force at the left or at the right can provide for separation of the device from the stand.

As explained, a power supply unit can include a cable where the cable may be detachable from the power supply unit or, for example, the cable may be integral and not detachable. Where the cable is detachable, it may be connectable to another device such as a computing device, a display device, etc. In such an example, the cable can have multiple uses and, for example, be part of a kit. As an example, a power supply unit can include wireless circuitry for transmission of power and/or can include electrical contact circuitry for transmission of power. As explained, a power supply unit can be stackable, where a stack may include more than two devices. For example, a stack can include a power supply unit, a stand and a display device, which may be a computing device and/or configured to utilize one or more computing components (e.g., processor and memory) of a stand where a stand includes such one or more computing components. As explained, a stack can extend to an accessory such as, for example, a stylus, which may be, for example, attachable to a device such as a display device, which may be a computing device. In various examples, a graphic or graphics may be rendered to a display of a device to indicate one or more of power connection, power level, etc., for one or more devices in a stack.

As explained, a power supply unit can include a magnet or magnets that may be utilized to magnetically couple the power supply unit to a device. In various examples, magnets may be utilized to align a power supply unit and a device for purposes of power transmission. For example, consider antenna alignment for wireless power transmission (e.g., using the Qi standard). As an example, magnets may help to align and to maintain contact between electrical contacts (e.g., spring-loaded pins, conductive surfaces, etc.).

As an example, a system can include a display device that includes a rectangular housing that includes a back side that includes a first arrangement of magnets; and a stand that includes a base, a flap and a hinge that couples the flap to the base, where the flap includes a second arrangement of magnets, where the first arrangement of magnets and the second arrangement of magnets provide a first magnetic attraction force that couples the rectangular housing to the flap in a first position and a second magnetic attraction force that couples the rectangular housing to the flap in a second position, where, in the second position, the rectangular housing is rotated by 90 degrees with respect to the first position. In such an example, the flap can include a circular perimeter and, for example, the base can include a cylinder that includes a flap end where, for example, the flap is coupled to the flap end of the cylinder by the hinge. As an example, a circumference of a flap can be approximately equal to a circumference of a cylinder of a base.

As an example, a base can include a flap end where a hinge is positioned at a perimeter of the flap end. In such an example, the hinge can couple a flap, at a perimeter of the flap, to the perimeter of the flap end.

As an example, a flap can be rotatable from a closed position to an open position via a hinge where, for example, the flap can be rotatable via the hinge by at least 45 degrees (e.g., from parallel to an end of a base that can be at 0 degrees). In such an example, the flap may be rotatable to approximately 90 degrees via the hinge.

As an example, a flap can include an electrical connector, where a back side of a rectangular housing includes an electrical connector, and where the electrical connectors mate via a first magnetic attraction force in a first position and via a second magnetic attraction force in a second position. For example, consider the rectangular housing being in a portrait position as a first position and in a landscape position as a second position.

As an example, a first magnetic attraction force may be approximately equal to a second magnetic attraction force or, for example, a first magnetic attraction force and a second magnetic attraction force can differ.

As an example, a first arrangement of magnets of a rectangular housing and a second arrangement of magnets of a flap can provide a magnetic force that is less than a first magnetic attraction force and that is less than a second magnetic attraction force at a position of the rectangular housing that is between a first position and a second position (e.g., between a portrait position and a landscape position).

As an example, a first arrangement of magnets of a rectangular housing and a second arrangement of magnets of a flap can provide a magnetic repulsion force at a position of the rectangular housing that is between a first position and a second position (e.g., between a portrait position and a landscape position).

As an example, a base can include a flap end and a bottom end, where the bottom end can include a coupling. In such an example, a planar support can be provided as part of a system that attaches to the base via the coupling. As an example, a turntable can be provided as part of a system where the turntable attaches to a base via a coupling. A turntable can include features such as bearings and raceways where a foot or feet support the turntable on a surface such that another component, which may or may not be part of the turntable, can rotate via the bearings and raceways. As an example, a turntable may include tracks where one track is rotatable with respect to another track. As an example, a turntable can include a spindle and a platform where the spindle can provide for rotation of the platform or a component attached to the spindle where the platform may remain stationary. As an example, a turntable may include one or more rolling elements to allow for rotational motion. For example, a base may be rotatable via one or more rolling elements; noting that one or more other mechanisms may be utilized to provide for rotation of a base.

As an example, a system may include a power supply unit that attaches to a base via a coupling. In such an example, the power supply unit may be received in a recess of the base and/or, for example, the power supply unit may include a recess that can receive a portion of the base. As an example, a power supply unit may include a cable where the power supply unit and/or a base provides for rotation of the base while the cable remains in a fixed position (e.g., stationary). For example, consider a base with a turntable or a power supply unit with a turntable that can provide for rotation of the base while a surface or surfaces contact a support surface (e.g., a tabletop, a desktop, a countertop, etc.) remain fixed (e.g., stationary) for support of the rotating base.

As an example, a display device can include a processor and memory accessible to the processor and/or a stand can include a processor and memory accessible to the processor and where the processor controls rendering of information to a display of a display device.

As an example, a system can include a display device that includes a rectangular housing that includes two short sides, two long sides, and a back side that includes a first arrangement of magnets located centrally at a long lever arm distance from each of the two short sides and a short lever arm distance from each of the two long sides; and a stand that includes a base, a flap and a hinge that couples the flap to the base, where the flap includes a second arrangement of magnets, where the first arrangement of magnets and the second arrangement of magnets provide an asymmetric magnetic attraction force that couples the rectangular housing to the flap, and where the asymmetric magnetic attraction force between the display device and the stand is weaker at the long lever arm distance and stronger at the short lever arm distance. In such an example, a detachment force for detaching the display device from the stand is greater along the short lever arm distance than along the long lever arm distance.

As an example, a first arrangement of magnets can include stronger magnets and weaker magnets, where the stronger magnets are disposed at a short lever arm distance and where the weaker magnets are disposed at a long lever arm distance. In such an example, a second arrangement of magnets can include magnets of equal strength.

As an example, a first arrangement of magnets of a rectangular housing and a second arrangement of magnets of a flap can provide a first magnetic attraction force that couples the rectangular housing to the flap in a first position and a second magnetic attraction force that couples the rectangular housing to the flap in a second position, where, in the second position, the rectangular housing is rotated by 90 degrees with respect to the first position (e.g., consider a portrait position and a landscape position of the rectangular housing). In such an example, the flap can include an electrical connector, where a back side of the rectangular housing includes an electrical connector, and where the electrical connectors mate via the first magnetic attraction force in the first position and via the second magnetic attraction force in the second position.

As an example, a base can include a flap end and a bottom end, where the bottom end includes a coupling. In such an example, a planar support can be included that attaches to the base via the coupling. As an example, a footprint of the planar support may exceed a footprint of the base. As an example, a power supply unit can be included as part of a system where the power supply unit attaches to a base via a coupling. In such an example, the power supply unit can lower the center of gravity of the base. For example, a power supply unit can have a mass and dimensions that provide for a relatively low center of gravity such that upon coupling the power supply unit to the base, the center of gravity of the base with the power supply unit is lower than the center of gravity of the base without the power supply unit.

As an example, a mass of a stand can exceed a mass of a display device. As an example, a stand can include ballast. As an example, ballast may be in the form of a material and/or circuitry. For example, consider a magnet of a speaker where the magnet is a permanent magnet that is relatively dense. As another example, consider ballast as being in the form of a battery. In such examples, the speaker magnet and/or the battery may be located in a lower half of a stand such that the center of gravity of the stand is within the lower half, optionally within a lower third.

As an example, a stand can include a speaker or speakers. In such an example, one or more speaker magnets may be included, which may be one or more permanent magnets. As an example, a permanent magnet can include neodymium.

As an example, a base can include a flap end and a bottom end, where the bottom end includes a suction cup. For example, consider a suction cup that can be utilized to help maintain stability of a base, whether from tipping or other movement on a support surface (e.g., a tabletop, a countertop, a desktop, etc.).

As an example, a flap can be rotatable from a closed position to an open position via the hinge. In such an example, the hinge can be a friction hinge where, for example, friction can hold the flap in a desired position. As an example, a hinge may include grooves and notches where a number of the notches can be received in a number of the grooves to increase frictional force to help maintain a flap in a desired position. As an example, grooves and notches may radiate outwardly and be defined by radii. In such an example, a user may apply a force greater than the frictional force to rotate the flap from one angle to another. In such an example, a hinge may include one or more spring elements such as, for example, a coiled spring, a disc spring, etc. For example, consider a coiled spring aligned along an axis, which may be an axis of an axle and/or consider a disc spring that is formed by a conical shell that can be loaded along its axis either statically or dynamically. As an example, a frusto-conical shape can give a disc spring (e.g., a Belleville washer, etc.) its spring characteristic. As an example, a hinge may be a detent hinge that includes a number of positions that may be pre-fixed or, for example, optionally adjustable. As an example, a hinge can be a friction hinge and/or a detent hinge.

As an example, a display device can include a processor and memory accessible to the processor and/or a stand can include a processor and memory accessible to the processor and where the processor controls rendering of information to a display of a display device.

As an example, a system can include a power cable that includes a plug and a cord; and a power supply unit that includes wireless charging circuitry and a disk shaped body that includes a recess, a power connector disposed in the recess and a cable notch as a passage from the recess to an outer perimeter of the disk shaped body, where the power connector is electrically coupled to the wireless charging circuitry and where the plug couples to the power connector and the cord passes through the cable notch. In such an example, the power supply unit can include a first arrangement of magnets for magnetic coupling to a second arrangement of magnets of a device. As an example, a system may include such a device where, for example, the device may include a display side and a back side, where the second arrangement of magnets is located at the back side of the device. As an example, a device can include a connector where a plug of a power cable couples to the connector of the device and can also couple to a connector of a power supply unit.

As an example, a device can include a display side, a back side, and a panel hinged to the back side. In such an example, the panel can include a second arrangement of magnets that can generate a magnetic attraction force with a first arrangement of magnets, which may be part of a power supply unit. In such an example, the magnetic attraction force between the first arrangement of magnets and the second arrangement of magnets can exceed a gravity force of a mass of the power supply unit. For example, the power supply unit may be facing downwardly when coupled to the panel. In such an example, the magnetic attraction force can be sufficient to prevent the power supply unit from undesirably falling off of the panel due to gravity. As such, the magnetic attraction force can be sufficient to hold the power supply unit on the panel when the panel is horizontal and hence over a range of angles of the panel (e.g., from 0 degrees as horizontal to 90 degrees as vertical).

As an example, a system can include a stand, where the stand is attachable to a power supply unit. In such an example, the stand may include a recess that receives at least a portion of the power supply unit. As an example, a stand may cover a recess of a power supply unit. For example, consider a stand that can cover a recess of a power supply unit such that a plug of a power cable is inaccessible (e.g., where the plug is connected to a connector disposed in the recess).

As an example, a stand can include a stand cable notch where a cord of a power cable passes through the stand cable notch. For example, consider a power supply unit that couples to the stand where a power cable includes a plug that may be covered by the stand and where a stand cable notch allows for a cord of the power cable to pass there-through.

As an example, a power supply unit can include a recess side and an opposing side, where a stand covers the opposing side. In such an example, a recess of the power supply unit can be exposed where a plug of a power cable can be accessible where the plug is connected to a connector disposed in the recess.

As an example, a stand can include a processor and memory accessible to the processor. For example, consider a stand that includes features of a voice-enabled assistant (VEA) such that the stand may be operable for various tasks. In such an example, the stand can include a battery or batteries that make the stand mobile such that it can be positioned as desired (e.g., taken from room to room, etc.) and be operable with or without a power supply unit and/or with or without a power cable.

As an example, a system can include a power supply unit, a power cable and a turntable. In such an example, the turntable can be rotatable without rotation of a recess of the power supply unit where a connector is disposed in the recess that can connect with a plug of the power cable. In such an example, the system can include a stand, where the stand is attachable to the turntable (e.g., for rotation of the stand). In such an example, the system can include a display device that can be coupled to the stand. As an example, the display device may receive power via the stand, which may be directly or indirectly provided to the display device. For example, consider a power supply unit coupled to the stand where the power supply unit provides power via a power cable where such power may be transmitted directly to the display device via wires or wirelessly and/or be transmitted indirectly to the display device via a battery (e.g., where the power supply unit charges a batter of the stand, etc.).

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory card, a storage disk, etc.) and referred to as a computer-readable storage medium.

Figure 23:
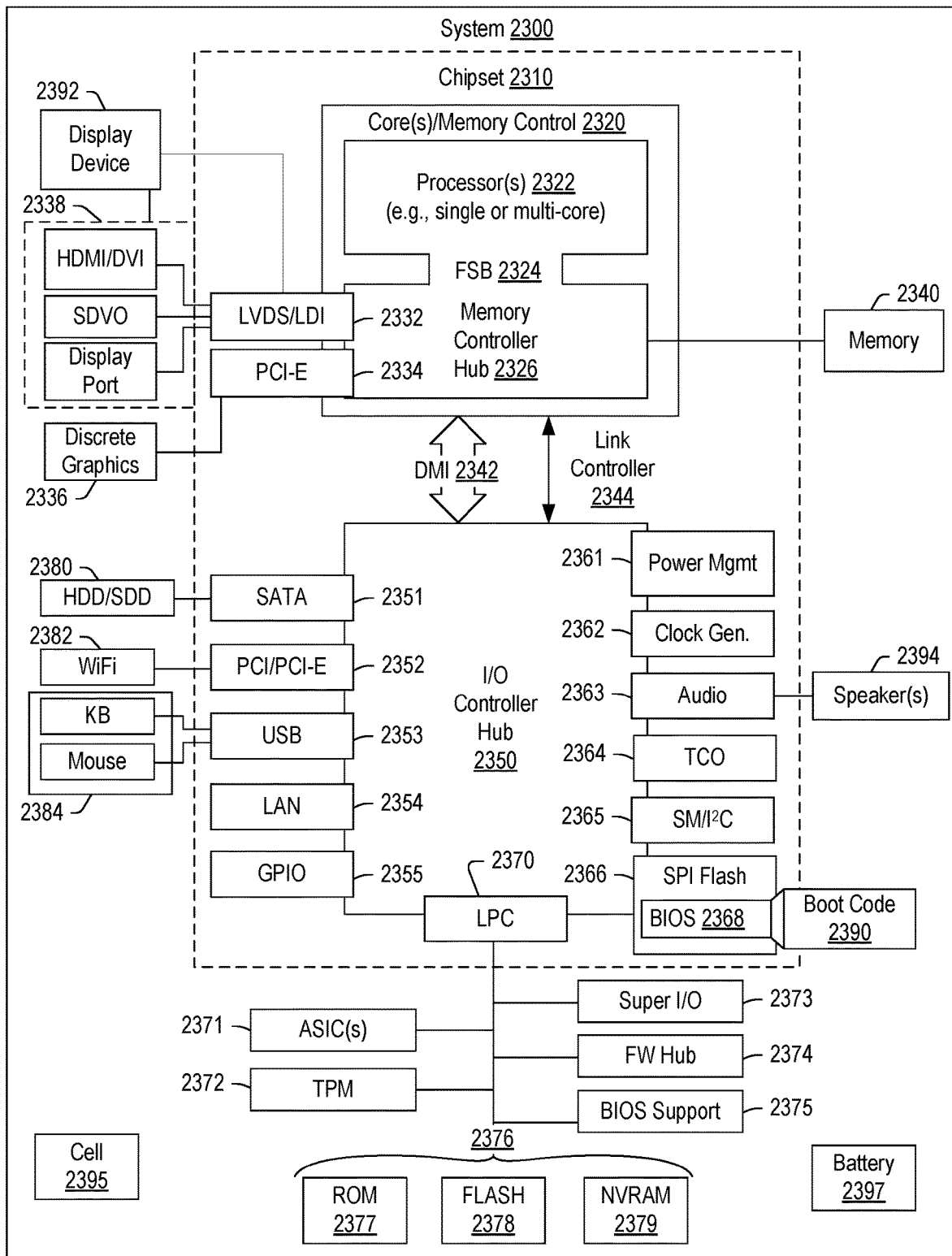
FIG. 23 is a diagram of an example of a system.

While various examples of circuits or circuitry have been discussed, FIG. 23 depicts a block diagram of an illustrative computer system 2300. The system 2300 may be a computer system sold by Lenovo (US) Inc. of Morrisville, NC (e.g., a THINKSTATION® system, etc.); however, as apparent from the description herein, a satellite, a base, a display, a dock, a keyboard, a computing device, a server or other machine may include one or more features and/or other features of the system 2300.

As an example, a monitor or display may include features such as one or more of the features included in one of the LENOVO® IDEACENTRE® or THINKCENTRE® "all-in-one" (AIO) computing devices (e.g., sold by Lenovo (US) Inc. of Morrisville, NC). For example, the LENOVO® IDEACENTRE® A720 computing device includes an Intel® Core i7 processor, a 27 inch frameless multi-touch display (e.g., for HD resolution of 1920×1080), a NVIDIA® GeForce® GT 630M 2 GB graphics card, 8 GB DDR3 memory, a hard drive, a DVD reader/writer, integrated Bluetooth® and 802.11b/g/n Wi-Fi®, USB connectors, a 6-in-1 card reader, a webcam, HDMI in/out, speakers, and a TV tuner.

As shown in FIG. 23, the system 2300 includes a so-called chipset 2310. A chipset refers to a group of integrated circuits, or chips, that are designed to work together. Chipsets are usually marketed as a single product (e.g., consider chipsets marketed under the brands INTEL®, AMD®, etc.).

In the example of FIG. 23, the chipset 2310 has a particular architecture, which may vary to some extent depending on brand or manufacturer. The architecture of the chipset 2310 includes a core and memory control group 2320 and an I/O controller hub 2350 that exchange information (e.g., data, signals, commands, etc.) via, for example, a direct management interface or direct media interface (DMI) 2342 or a link controller 2344. In the example of FIG. 23, the DMI 2342 is a chip-to-chip interface (sometimes referred to as being a link between a "northbridge" and a "southbridge").

The core and memory control group 2320 include one or more processors 2322 (e.g., single core or multi-core) and a memory controller hub 2326 that exchange information via a front side bus (FSB) 2324. As described herein, various components of the core and memory control group 2320 may be integrated onto a single processor die, for example, to make a chip that supplants the conventional "northbridge" style architecture.

The memory controller hub 2326 interfaces with memory 2340. For example, the memory controller hub 2326 may provide support for DDR SDRAM memory (e.g., DDR, DDR2, DDR3, etc.). In general, the memory 2340 is a type of random-access memory (RAM). It is often referred to as "system memory".

The memory controller hub 2326 further includes a low-voltage differential signaling interface (LVDS) 2332. The LVDS 2332 may be a so-called LVDS Display Interface (LDI) for support of a display device 2392 (e.g., a CRT, a flat panel, a projector, etc.). A block 2338 includes some examples of technologies that may be supported via the LVDS interface 2332 (e.g., serial digital video, HDMI/DVI, display port). The memory controller hub 2326 also includes one or more PCI-express interfaces (PCI-E) 2334, for example, for support of discrete graphics 2336. Discrete graphics using a PCI-E interface has become an alternative approach to an accelerated graphics port (AGP). For example, the memory controller hub 2326 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 2350 includes a variety of interfaces. The example of FIG. 23 includes a SATA interface 2351, one or more PCI-E interfaces 2352 (optionally one or more legacy PCI interfaces), one or more USB interfaces 2353, a LAN interface 2354 (more generally a network interface), a general purpose I/O interface (GPIO) 2355, a low-pin count (LPC) interface 2370, a power management interface 2361, a clock generator interface 2362, an audio interface 2363 (e.g., for speakers 2394), a total cost of operation (TCO) interface 2364, a system management bus interface (e.g., a multi-master serial computer bus interface) 2365, and a serial peripheral flash memory/controller interface (SPI Flash) 2366, which, in the example of FIG. 23, includes BIOS 2368 and boot code 2390. With respect to network connections, the I/O hub controller 2350 may include integrated gigabit Ethernet controller lines multiplexed with a PCI-E interface port. Other network features may operate independent of a PCI-E interface.

The interfaces of the I/O hub controller 2350 provide for communication with various devices, networks, etc. For example, the SATA interface 2351 provides for reading, writing or reading and writing information on one or more drives 2380 such as HDDs, SDDs or a combination thereof. The I/O hub controller 2350 may also include an advanced host controller interface (AHCI) to support one or more drives 2380. The PCI-E interface 2352 allows for wireless connections 2382 to devices, networks, etc. The USB interface 2353 provides for input devices 2384 such as keyboards (KB), one or more optical sensors, mice and various other devices (e.g., microphones, cameras, phones, storage, media players, etc.). On or more other types of sensors may optionally rely on the USB interface 2353 or another interface (e.g., I²C, etc.). As to microphones, the system 2300 of FIG. 23 may include hardware (e.g., audio card) appropriately configured for receipt of sound (e.g., user voice, ambient sound, etc.).

In the example of FIG. 23, the LPC interface 2370 provides for use of one or more ASICs 2371, a trusted platform module (TPM) 2372, a super I/O 2373, a firmware hub 2374, BIOS support 2375 as well as various types of memory 2376 such as ROM 2377, Flash 2378, and non-volatile RAM (NVRAM) 2379. With respect to the TPM 2372, this module may be in the form of a chip that can be used to authenticate software and hardware devices. For example, a TPM may be capable of performing platform authentication and may be used to verify that a system seeking access is the expected system.

The system 2300, upon power on, may be configured to execute boot code 2390 for the BIOS 2368, as stored within the SPI Flash 2366, and thereafter processes data under the control of one or more operating systems and application software (e.g., stored in system memory 2340). An operating system may be stored in any of a variety of locations and accessed, for example, according to instructions of the BIOS 2368. Again, as described herein, a satellite, a base, a server or other machine may include fewer or more features than shown in the system 2300 of FIG. 23. Further, the system 2300 of FIG. 23 is shown as optionally include cell phone circuitry 2395, which may include GSM, CDMA, etc., types of circuitry configured for coordinated operation with one or more of the other features of the system 2300. As shown, the system 2300 may include one or more batteries 2397 and, for example, battery management circuitry.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A system comprising:
    a display device that comprises a rectangular housing that comprises a back side that comprises a first arrangement of magnets; and
    a stand that comprises a base, a flap and a hinge that couples the flap to the base, wherein the flap comprises a second arrangement of magnets, wherein the first arrangement of magnets and the second arrangement of magnets provide a first magnetic attraction force that couples the rectangular housing to the flap in a first position and a second magnetic attraction force that couples the rectangular housing to the flap in a second position, wherein, in the second position, the rectangular housing is rotated by 90 degrees with respect to the first position, wherein the magnets comprise stop magnets, movement magnets, and guide magnets, wherein the guide magnets comprise stable states with respect to the movement magnets at the first position and the second position, and guide states with respect to the movement magnets that urge the rectangular housing to one of the stable states.

2. The system of claim 1, wherein the flap comprises a circular perimeter.

3. The system of claim 1, wherein the base comprises a cylinder that comprises a flap end.

4. The system of claim 3, wherein the flap is coupled to the flap end of the cylinder by the hinge.

5. The system of claim 3, wherein a circumference of the flap is approximately equal to a circumference of the cylinder.

6. The system of claim 1, wherein the base comprises a flap end and wherein the hinge is positioned at a perimeter of the flap end.

7. The system of claim 6, wherein the hinge couples the flap, at a perimeter of the flap, to the perimeter of the flap end.

8. The system of claim 1, wherein the flap is rotatable from a closed position to an open position via the hinge.

9. The system of claim 8, wherein the flap is rotatable via the hinge by at least 45 degrees.

10. The system of claim 1, wherein the flap comprises an electrical connector, wherein the back side of the rectangular housing comprises an electrical connector, and wherein the electrical connectors mate via the first magnetic attraction force in the first position and via the second magnetic attraction force in the second position.

11. The system of claim 1, wherein the first magnetic attraction force and the second magnetic attraction force differ.

12. The system of claim 1, wherein the first arrangement of magnets and the second arrangement of magnets provide a magnetic force that is less than the first magnetic attraction force and that is less than the second magnetic attraction force at a position of the rectangular housing that is between the first position and the second position.

13. The system of claim 1, wherein the base comprises a flap end and a bottom end, wherein the bottom end comprises a coupling.

14. The system of claim 13, comprising a planar support that attaches to the base via the coupling.

15. The system of claim 13, comprising a turntable that attaches to the base via the coupling.

16. The system of claim 13, comprising a power supply unit that attaches to the base via the coupling.

17. The system of claim 1, wherein the display device comprises a processor and memory accessible to the processor.

18. The system of claim 1, wherein the stand comprises a processor and memory accessible to the processor and wherein the processor controls rendering of information to a display of the display device.

19. A system comprising:
a display device that comprises a rectangular housing that comprises a back side that comprises a first arrangement of magnets; and
a stand that comprises a base, a flap and a hinge that couples the flap to the base, wherein the base comprises a cylinder that comprises a flap end, wherein the hinge is positioned at a perimeter of the flap end, wherein the flap is coupled to the flap end of the cylinder by the hinge, wherein a circumference of the flap is approximately equal to a circumference of the cylinder, wherein the flap is rotatable from a closed position to an open position via the hinge by at least 45 degrees, wherein the flap comprises a second arrangement of magnets, wherein the first arrangement of magnets and the second arrangement of magnets provide a first magnetic attraction force that couples the rectangular housing to the flap in a first position and a second magnetic attraction force that couples the rectangular housing to the flap in a second position, wherein, in the second position, the rectangular housing is rotated by 90 degrees with respect to the first position.

* * * * *